(12) United States Patent
Li et al.

(10) Patent No.: US 12,126,571 B2
(45) Date of Patent: Oct. 22, 2024

(54) TECHNIQUE FOR MITIGATING REMOTE INTERFERENCE

(71) Applicant: Telefonaktiebolaget LM Ericsson (publ), Stockholm (SE)

(72) Inventors: Jingya Li, Gothenburg (SE); Sebastian Faxér, Stockholm (SE); Naga Vishnu Kanth Irukulapati, Västra Frölunda (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 615 days.

(21) Appl. No.: 17/427,205

(22) PCT Filed: Feb. 14, 2020

(86) PCT No.: PCT/EP2020/053858
§ 371 (c)(1),
(2) Date: Jul. 30, 2021

(87) PCT Pub. No.: WO2020/165395
PCT Pub. Date: Aug. 20, 2020

(65) Prior Publication Data
US 2022/0150033 A1 May 12, 2022

Related U.S. Application Data

(60) Provisional application No. 62/806,642, filed on Feb. 15, 2019.

(51) Int. Cl.
*H04L 5/00* (2006.01)
*H04B 7/155* (2006.01)
*H04L 5/18* (2006.01)

(52) U.S. Cl.
CPC ....... *H04L 5/0073* (2013.01); *H04B 7/15542* (2013.01); *H04L 5/0048* (2013.01); *H04L 5/0053* (2013.01); *H04L 5/18* (2013.01)

(58) Field of Classification Search
None
See application file for complete search history.

(56) References Cited

U.S. PATENT DOCUMENTS

| 11,909,697 B2 * | 2/2024 | Ghozlan | ............... H04J 11/0056 |
| 2022/0006552 A1 * | 1/2022 | Ghozlan | ................. H04L 5/005 |

(Continued)

FOREIGN PATENT DOCUMENTS

WO 2018228421 A1 12/2018

OTHER PUBLICATIONS

"ZTE, Discussion on OAM functions to support RIM operation, 3GPP TSG RAN WG1 Ad-Hoc Meeting 1901, R1-1900224, Jan. 25, 2019" (Year: 2019).*

(Continued)

*Primary Examiner* — Jenkey Van
(74) *Attorney, Agent, or Firm* — COATS & BENNETT, PLLC

(57) ABSTRACT

A method of handling a remote interference (RI) between base stations of a time division duplex (TDD) network is provided. The method comprises or initiates a step of determining a set of radio resources for reference signals (RSs) for handling the RI. The method further comprises or initiates a step of handling the RI by at least one of transmitting and receiving one or more RSs using the radio resources of the determined set.

21 Claims, 19 Drawing Sheets

(56) References Cited

U.S. PATENT DOCUMENTS

2022/0141694 A1\* 5/2022 Miao ................... H04B 17/345
370/252
2022/0150012 A1\* 5/2022 Su ........................ H04L 5/0007

OTHER PUBLICATIONS

ZTE, "Discussion on RIM RS resource and configurations", 3GPP TSG RAN WG1 Ad-Hoc Meeting 1901, Jan. 21-25, 2019, pp. 1-8, Taipei, R1-1900223.

ZTE, "Discussion on OAM functions to support RIM operation", 3GPP TSG RAN WG1 Ad-Hoc Meeting 1901, Jan. 21-25, 2019, pp. 1-8, Taipei, R1-1900224.

Ericsson, "On RIM RS resource and configurations", 3GPP TSG RAN WG1 Meeting Ad-Hoc Meeting 1901, Jan. 21-25, 2019, pp. 1-12, Taipei, Taiwan, R1-1900760.

3rd Generation Partnership Project, Technical Specification Group Radio Access Network; V2X Services based on NR; User Equipment (UE) radio transmittal and reception; (Release 16), 3GPP TR 38.886 V16.0.0, Jun. 1, 2020, pp. 1-88.

ETSI, "LTE; Evolved Universal Terrestrial Radio Access (E-UTRA); Physical channels and modulation", ETSI TS 136 211 V15.4.0, (3GPP TS 36.211 version 15.4.0 Release 15), May 1, 2019, pp. 1-242.

ZTE, "Discussion on RIM mechanisms for improving network robustness", 3GPP TSG RAN WG1 Meeting #95, Spokane, USA, Nov. 12-16, 2018, pp. 1-13, R1-1812440, 3GPP.

\* cited by examiner

100

200

1800

1900

TECHNIQUE FOR MITIGATING REMOTE INTERFERENCE

TECHNICAL FIELD

The present disclosure relates to interference between base stations of a cellular network. More specifically, and without limitation, methods and devices for mitigating remote interference are provided.

BACKGROUND

A wireless cellular network is built up of cells. Each cell is defined by a certain coverage area of a radio base station (BS) providing radio access in the respective cell. The BSs wirelessly communicate with radio devices (also referred to as terminals or user equipments, UE) in the network. The communication is carried out in either paired or unpaired spectrum. In case of paired spectrum, the radio resources for downlink (DL) and uplink (UL) directions are separated in frequency, which is referred to as Frequency Division Duplex (FDD). In case of unpaired spectrum, DL and UL use the same spectrum, which is referred to as Time Division Duplex (TDD). In TDD, DL and UL radio resources are separated in the time domain, typically using a guard period (GP) between them.

The GP serves several purposes including interference protection in TDD networks. Most essentially, the processing circuitry at the BS and UE needs sufficient time to switch between transmission and reception, e.g., at a DL-UL switch point. This is typically a fast procedure and does not significantly contribute to the requirement of the GP size. In addition, the GP must be sufficiently large to allow a UE to receive a (time-delayed) DL grant scheduling the UL and transmit the UL signal with proper timing advance (compensating for the propagation delay) such that it is received in the UL part of the frame at the BS. Thus, the GP should be larger than two times the propagation time towards a UE at the cell edge, otherwise, the UL and DL signals in the cell will interfere. Because of this, the GP is typically chosen to depend on the cell size such that larger cells (i.e., larger inter-site distances) have a larger GP and vice versa.

Furthermore, the GP is used to reduce Remote Interference (RI) such as DL-to-UL interference between BSs by allowing a certain propagation delay between cells without having the DL transmission of a first BS enter the UL reception of a second BS. In a typical macro network, the DL transmission power can be on the order of 20 dB larger than the UL transmission power. Hence, if the UL is interfered by the DL of other cells, so called cross-link interference, the UL performance can be seriously degraded. Because of the large transmit power discrepancy between UL and DL, cross-link interference can be detrimental to system performance not only in the case of a co-channel (i.e., when the DL interferes with the UL on the same carrier) but also in the case of adjacent channels (i.e., when the DL of one carrier interferes with the UL on an adjacent carrier). To avoid DL-to-UL interference, TDD macro networks are typically operated in a synchronized fashion, i.e., the symbol timing is aligned and a semi-static TDD pattern is used for allocating UL and DL radio resources, which is also referred to as TDD UL-DL pattern. Furthermore, the TDD UL-DL pattern is the same for all the cells in the network. Moreover, operators with adjacent TDD carriers typically synchronize their TDD UL-DL patterns to avoid adjacent channel cross-link interference.

In certain weather conditions and in certain regions of the world, a ducting phenomenon can occur in the atmosphere, which is known as atmospheric ducting. The appearance of the duct is dependent on, for example, temperature and humidity. When the ducting occurs, the atmospheric duct can effectively channel radio signals to propagate a significantly longer distance than if the atmospheric duct was not present.

The atmospheric duct may comprise a layer with a rapid decrease in the refractivity of the lower atmosphere (e.g., in the troposphere). In this way, atmospheric ducts can trap the propagating signals in the ducting layer, instead of radiating out in space. Thus, most of the signal energy propagates in the ducting layer, which acts as a wave-guide. Therefore, trapped signals can propagate beyond line-of-sight distances with relatively low path loss, sometimes even lower than in line-of-sight propagation.

The atmospheric duct is an example for intermitted RI between interfering and interfered BSs. The interfered BS can indicate the RI to the interfering BS by transmitting a RI management reference signal (RIM-RS). The Third Generation Partnership Project (3GPP), which is a platform for defining existing and future radio access technologies for cellular networks, has recently agreed (cf. 3GPP RAN1 AH 1901) that one time occasion for transmitting the RIM-RS is configured per DL-UL switch point. In this case, there can be more than one RIM-RS resource occasions per DL-UL switch point if multiple RIM-RS resources are configured to be multiplexed in the frequency domain.

However, in some cases, it is preferred to not transmit RIM-RS in every TDD DL-UL switch point, e.g., in a TDD pattern which has very a short UL duration. Thus, a mechanism is needed to support disabling a subset of possible RIM-RS resources such that no RIM-RS will be transmitted on these resources.

SUMMARY

Accordingly, there is a need for a technique that allows handling a remote interference more efficiently. Alternatively or in addition, there is a need for a technique that supports restricting and/or disabling a subset of possible radio resources for handling a remote interference.

As to a first method aspect, a method of handling a remote interference (RI) between base stations of a time division duplex (TDD) network is provided. The method comprises or initiates a step of determining a set of radio resources for reference signals (RSs) for handling the RI. The method further comprises or initiates a step of handling the RI by at least one of transmitting and receiving one or more RSs using the radio resources of the determined set.

At least in some cases, by determining the set, embodiments of the technique can transmit or receive the RSs (e.g., RI management RSs, RIM-RSs) not in every radio resource occasion for the RS, e.g., not in every TDD DL-UL switch point or period. For example, the set may exclude radio resources in a TDD DL-UL pattern that has very a short UL duration. Same of further embodiments of the technique may provide a mechanism to support restricting or disabling a subset of possible radio resources for the RSs (e.g., RIM-RS resources).

In at least some embodiments, the handling can mitigate Cross-Link Interference (CLI). Same or further embodiments may be implemented as a method to define a candidate RIM-RS resource set that is a subset of all possible RIM-RS resources, and the RIM-RS is transmitted only on the defined candidate RIM-RS resources.

The technique may be implemented as a technique for Remote Interference Management (RIM) and/or RIM reference signal (RIM-RS) configuration.

The technique may be implemented in 3GPP New Radio (NR) networks or 3GPP Long Term Evolution (LTE) networks. Particularly, the technique may be implemented in a 3GPP TDD network using frame structure type 2 according to the 3GPP document TS 36.211 for LTE or the 3GPP document TS 38.211 for NR.

The technique, particularly the first method aspect, may be implemented according to any of the attached list of embodiments, optionally in combination with any of the features and embodiments disclosed with reference to the drawings.

As to a second method aspect, a method of controlling the handling of a remote interference (RI) between base stations of a time division duplex (TDD) network is provided. The RI is handled based on at least one of transmitting and receiving one or more reference signals (RSs) at the base stations. The method comprises or initiates a step of determining a set of radio resources for the RSs for the handling of the RI and/or determining whether the receiving and/or transmitting of the RSs is restricted to the set or allowed in all radio resource occasions for the RSs in the TDD network. The method further comprises or initiates a step of transmitting, to at least one of the base stations, one or more control messages indicative of one or each of the results of the determination.

The second method aspect may further comprise any feature and any step disclosed in the context of the first method aspect, or a feature or step corresponding thereto, e.g., a receiver counterpart to a transmitter feature or step.

The technique, particularly the second method aspect, may be implemented according to any of the attached list of embodiments, optionally in combination with any of the features and embodiments disclosed with reference to the drawings.

The first method aspect may be performed at or by any one of the base stations. The base station may be any station or node of the TDD network.

The second method aspect may be performed at or by an Operations and Management (OAM) functionality or an OAM node of the TDD network.

The base stations may form, or may be part of, the TDD network, e.g., according to the Third Generation Partnership Project (3GPP) or according to the standard family IEEE 802.11 (Wi-Fi). The first and second method aspects may be performed by one or more embodiments of the base station and the OAM node, respectively, in the TDD network. The TDD network may be a radio access network (RAN). The RAN may comprise one or more embodiments of the base stations, e.g., each performing the method.

Any of the base stations may provide radio access to one or more radio devices, e.g., a 3GPP user equipment (UE) or a Wi-Fi station (STA). The radio device may be a mobile or portable station, a device for machine-type communication (MTC), a device for narrowband Internet of Things (NB-IoT) or a combination thereof.

Examples for the UE and the mobile station include a mobile phone, a tablet computer and a self-driving vehicle. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in a manufacturing plant, household appliances and consumer electronics.

Any of the radio devices may be wirelessly connected or connectable (e.g., according to a radio resource control, RRC, state or active mode) with any of the base stations.

The base station may encompass any station that is configured to provide radio access to any of the radio devices. The base stations may also be referred to as transmission and reception point (TRP), radio access node or access point (AP). The base station or one of the radio devices functioning as a gateway (e.g., between the radio network and the RAN and/or the Internet) may provide a data link to a host computer providing the first and/or second data. Examples for the base stations may include a 3G base station or Node B, 4G base station or eNodeB, a 5G base station or gNodeB, a Wi-Fi AP and a network controller.

The RAN may be implemented according to the Global System for Mobile Communications (GSM), the Universal Mobile Telecommunications System (UMTS), 3GPP Long Term Evolution (LTE) and/or 3GPP New Radio (NR).

Any aspect of the technique may be implemented on a Physical Layer (PHY), a Medium Access Control (MAC) layer, a Radio Link Control (RLC) layer and/or a Radio Resource Control (RRC) layer of a protocol stack for the radio communication.

As to another aspect, a computer program product is provided. The computer program product comprises program code portions for performing any one of the steps of the method aspect disclosed herein when the computer program product is executed by one or more computing devices. The computer program product may be stored on a computer-readable recording medium. The computer program product may also be provided for download, e.g., via the radio network, the RAN, the Internet and/or the host computer. Alternatively, or in addition, the method may be encoded in a Field-Programmable Gate Array (FPGA) and/or an Application-Specific Integrated Circuit (ASIC), or the functionality may be provided for download by means of a hardware description language.

As to a first device aspect, a device for handling a remote interference (RI) between base stations of a time division duplex (TDD) network is provided. The device is configured to perform any one of the steps of the first method aspect.

As to a second device aspect, a device for controlling the handling of a remote interference (RI) between base stations of a time division duplex (TDD) network is provided. The device is configured to perform any one of the steps of the second method aspect.

As to a further first device aspect, a device for handling a remote interference (RI) between base stations of a time division duplex (TDD) network is provided. The device comprises at least one processor and a memory. Said memory comprises instructions executable by said at least one processor whereby the device is operative to perform any one of the steps of the first method aspect.

As to a further second device aspect, a device for controlling the handling of a remote interference (RI) between base stations of a time division duplex (TDD) network is provided. The device comprises at least one processor and a memory. Said memory comprises instructions executable by said at least one processor whereby the device is operative to perform any one of the steps of the second method aspect.

As to a still further aspect a communication system including a host computer is provided. The host computer comprises a processing circuitry configured to provide user data. The host computer further comprises a communication interface configured to forward the user data to a TDD network (e.g., the RAN and/or at least one of the base stations) for transmission to a UE. A processing circuitry of the cellular network is configured to execute any one of the steps of the first method aspect.

The communication system may further include the UE. Alternatively, or in addition, the cellular network may further include one or more of the base stations configured for radio communication with the UE and/or for performing the first method aspect.

The processing circuitry of the host computer may be configured to execute a host application, thereby providing the first and/or second data and/or any host computer functionality described herein. Alternatively, or in addition, the processing circuitry of the UE may be configured to execute a client application associated with the host application.

Any one of the devices, the UE, the base station, the communication system or any node or station for embodying the technique may further include any feature disclosed in the context of the method aspect, and vice versa. Particularly, any one of the units and modules disclosed herein may be configured to perform or initiate one or more of the steps of the first and/or second method aspects.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a New Radio (NR) or 5G implementation, it is readily apparent that the technique described herein may also be implemented for any other radio communication technique, including a Wireless Local Area Network (WLAN) implementation according to the standard family IEEE 802.11 and 3GPP LTE (e.g., LTE-Advanced or a related radio access technique such as MulteFire).

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
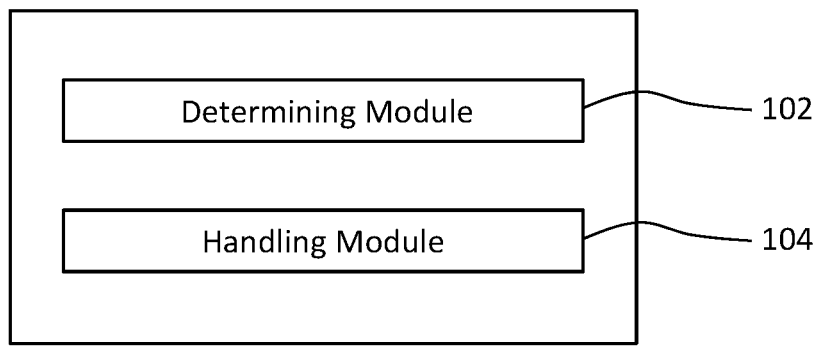
FIG. 1 shows a schematic block diagram of an embodiment of a device for handling a remote interference between base stations of a time division duplex network.

FIG. 1 schematically illustrates a block diagram of an embodiment of a device for handling a remote interference (RI) between base stations of a time division duplex (TDD) network. The device is generically referred to by reference sign 100.

The device 100 comprises a determining module 102 that determines a set of radio resources for reference signals (RSs) for handling the RI. The device further comprises a handling module 104 for handling the RI by at least one of transmitting and receiving one or more RSs using the radio resources of the determined set.

Any of the modules of the device 100 may be implemented by units configured to provide the corresponding functionality.

The device 100 may also be referred to as, or may be embodied by, any one of the base stations. Embodiments of the base stations 100 may be in direct radio communication by means of the RSs.

Figure 2:
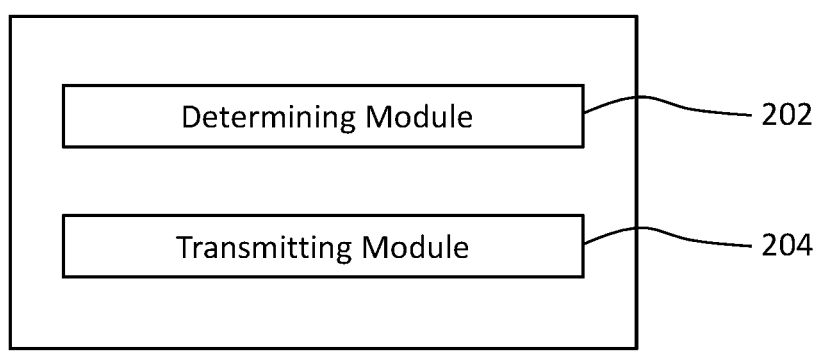
FIG. 2 shows a schematic block diagram of an embodiment of a device for controlling the handling of a remote interference between base stations of a time division duplex network.

FIG. 2 schematically illustrates a block diagram of an embodiment of a device for controlling the handling of a RI between base stations of a TDD network. The RI is handled based on at least one of transmitting and receiving one or more RSs at the base stations. The device is generically referred to by reference sign 200.

The device 200 comprises a determination module 202 that determines a set of radio resources for the RSs for the handling of the RI and/or that determines whether the receiving and/or transmitting of the RSs is (or is to be) restricted to the set or allowed in all radio resource occasions for the RSs in the TDD network. The device 200 further comprises a determination module 204 that transmits, to at least one of the base stations, one or more control messages indicative of one or each of the results of the determination.

Any of the modules of the device 200 may be implemented by units configured to provide the corresponding functionality.

The device 200 may also be referred to as, or may be embodied by, an operations and management (OAM) function or node (or briefly: OAM). The OAM node 200 and the base stations may be in direct radio communication. At least one or each of the base stations may be embodied by the device 100.

Figure 3:
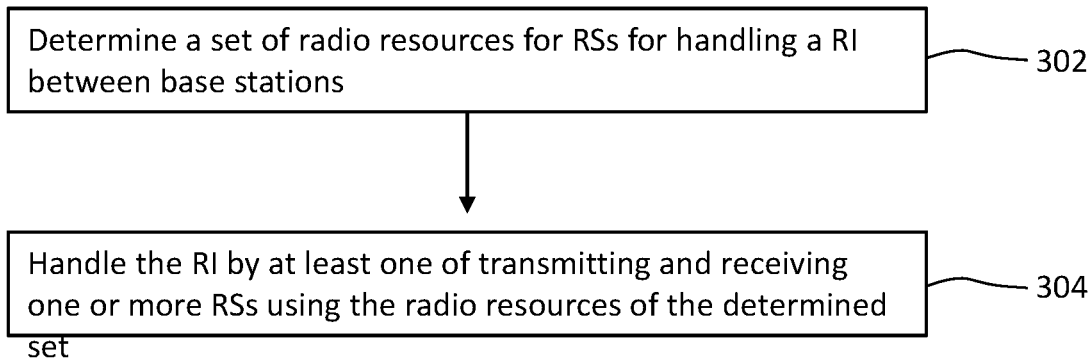
FIG. 3 shows a flowchart for a method of handling a remote interference between base stations of a time division duplex network, which method may be implementable by the device of FIG. 1.

FIG. 3 shows an example flowchart for a method 300 of handling a RI between base stations of a TDD network. In a step 302, a set of radio resources for RSs for handling the RI is determined. In a step 304, the RI is handled by at least one of transmitting and receiving one or more RSs using the radio resources of the determined set.

The method 300 may be performed by the device 100. For example, the modules 102 and 104 may perform the steps 302 and 304, respectively.

Figure 4:
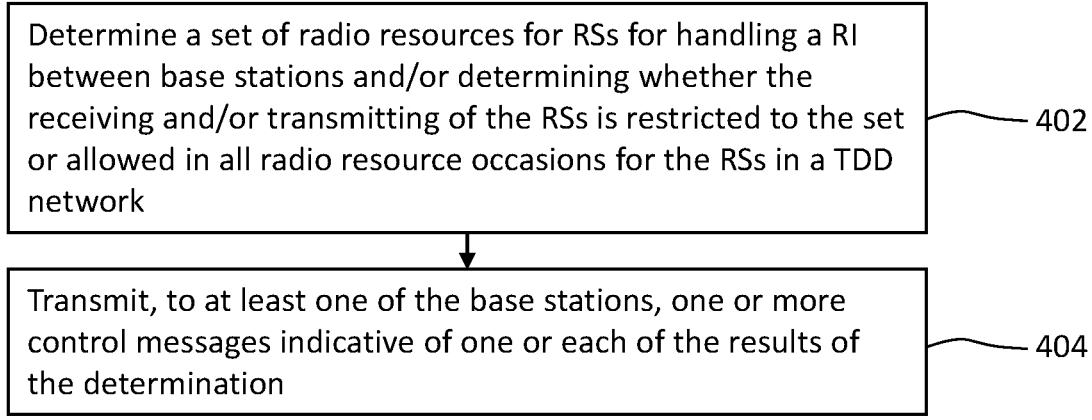
FIG. 4 shows a flowchart for a method of controlling the handling of a remote interference between base stations of a time division duplex network, which method may be implementable by the device of FIG. 2.

FIG. 4 shows an example flowchart for a method 400 of controlling the handling of a RI between base stations of a TDD network. The RI is handled based on at least one of transmitting and receiving one or more RSs at the base stations. In a step 402, a set of radio resources for the RSs for the handling of the RI is determined. Alternatively or in addition, it is determined whether the receiving and/or transmitting of the RSs is (or is to be) restricted to the set or allowed in all radio resource occasions for the RSs in the TDD network. In a step 404, one or more control messages indicative of one or each of the results of the determination 402 are transmitted to at least one of the base stations.

The method 400 may be performed by the device 200. For example, the modules 202 and 204 may perform the steps 402 and 404, respectively.

Each of the devices 100 may be a base station providing radio access to one or more radio devices. Herein, any radio device may be a mobile or portable station and/or any radio device wirelessly connectable to a base station or RAN, or to another radio device. For example, the radio device may be a user equipment (UE), a device for machine-type communication (MTC) or a device for (e.g., narrowband) Internet of Things (IoT). Two or more radio devices may be configured to wirelessly connect to each other, e.g., in an ad hoc radio network or via a 3GPP SL connection. Furthermore, any base station may be a station providing radio access, may be part of a radio access network (RAN) and/or may be a node connected to the RAN for controlling the radio access. For example, the base station may be an access point, for example a Wi-Fi access point.

The next generation mobile wireless communication system (5G) or new radio (NR), supports a diverse set of use cases and a diverse set of deployment scenarios. The latter includes deployment at both low frequencies (e.g., 100s of MHz, e.g., 400 to 900 or 800 to 2600 MHz), similar to LTE today, and higher frequencies (e.g., mm waves in the tens of GHz, e.g., 24 GHz to 60 GHz).

Similar to LTE, the NR Frame Structure uses Orthogonal Frequency Division Multiplexing (OFDM) in the downlink (DL), i.e. from a base station (e.g., a gNB or eNB or any other network node), to a radio device (i.e., a user equipment, UE).

Figure 5:
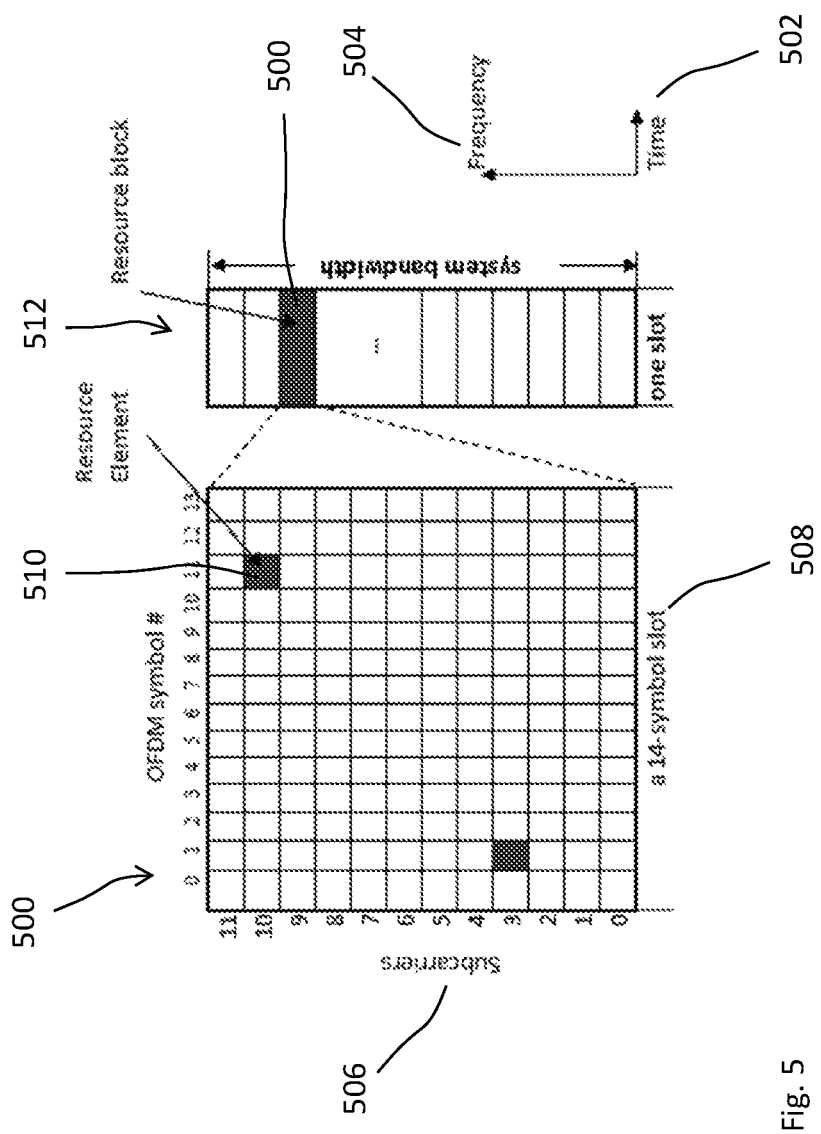
FIG. 5 schematically illustrates radio resources for implementing the devices of FIGS. 1 and 2.

The basic NR physical resource over an antenna port can thus be seen as a time-frequency grid, an example of which is illustrated in FIG. 5. In the NR physical resource grid shown in FIG. 5, time increase on a horizontal axis 502 to the right. Frequency increases on a vertical axis 504 to the top.

In the example of FIG. 5, a resource block 500 in a 14-symbol slot 508 is shown. A resource block 500 corresponds to 12 contiguous subcarriers 506 in the frequency domain 504.

Resource blocks 500, examples of which are illustrated at the right-hand side of FIG. 5, are numbered in the frequency domain 504, starting with 0 from one end of the system bandwidth 512. Each resource element 510 corresponds to one OFDM subcarrier during one OFDM symbol interval.

Different subcarrier spacing values are supported in NR. The values supported for the subcarrier spacing (SCS), which are also referred to as different numerologies, are given by $\Delta f=(15\times2^{\alpha})$ kHz, wherein $\alpha \in (0,1,2,3,4)$. $\Delta f=15$ kHz is the basic or reference SCS that is also used in LTE.

In the time domain 502, downlink (DL) and uplink (UL) transmissions in NR are organized into equally-sized subframes of 1 ms each, similar to LTE. A subframe is further divided into multiple slots of equal duration. The slot length for subcarrier spacing $\Delta f=(15\times2^{\alpha})$ kHz is $\frac{1}{2}^{\alpha}$ ms. There is only one slot per subframe at $\Delta f=15$ kHz and a slot consists of 14 OFDM symbols.

DL transmissions are dynamically scheduled, i.e., in each slot 508, the gNB transmits downlink control information (DCI) about which UE data is to be transmitted to and which resource blocks in the current downlink slot 508, the data is transmitted on. This control information is typically transmitted in the first one or two OFDM symbols in each slot in NR. The control information is carried on the Physical Control Channel (PDCCH) and data is carried on the Physical Downlink Shared Channel (PDSCH). A UE first detects and decodes PDCCH and if a PDCCH is decoded successfully, it then decodes the corresponding PDSCH based on the decoded control information in the PDCCH.

In addition to PDCCH and PDSCH, there are also other channels and reference signals transmitted in the downlink.

Uplink data transmissions, carried on Physical Uplink Shared Channel (PUSCH), are also dynamically scheduled by the gNB by transmitting a DCI. In case of TDD operation, the DCI (which is transmitted in the DL region) always indicates a scheduling offset so that the PUSCH is transmitted in a slot in the UL region.

Figure 6:
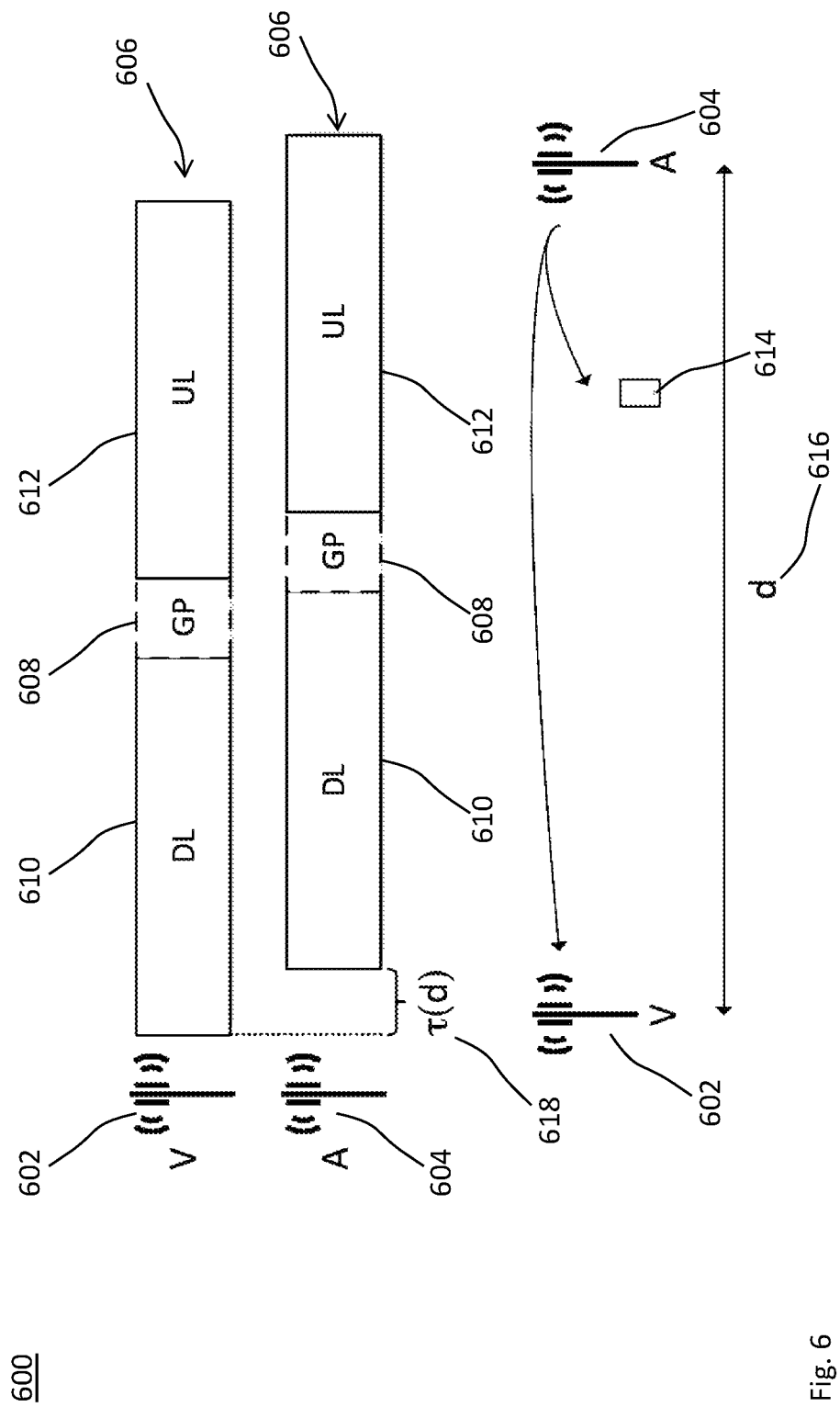
FIG. 6 schematically illustrates a first example of a network environment for implementing the devices of FIGS. 1 and 2.

FIG. 6 schematically illustrates a radio environment 600 comprising at least two neighboring base stations 602 and 604 using an example of a TDD pattern, which is generically referred to by reference sign 606. The TDD pattern 606 comprises a guard period (GP) 608 between a DL period or DL part 610 and an UL period or UL part 612.

The principle of applying a GP 608 to avoid DL-to-UL interference between BSs 602 and 604 is schematically shown in FIG. 6. The BS 602 is a victim BS (labeled V) that is (at least potentially) interfered by the BS 604, i.e., an aggressor BS (labeled A). When the aggressor BS 604 transmits a DL signal to a radio device 614 in its cell, the DL signal also reaching the victim BS 602, i.e., the propagation loss is not enough to protect the BS 602 from the signals of BS 604. The signal is propagated a distance 616 (labeled d). Due to propagation delay, the experienced frame structure alignment of the BS 604 (A) at the BS 602 (V) is shifted or delayed by a time period or delay 618 (labeled $\tau$, e.g., $\tau$ seconds). The delay 618 is proportional to the propagation distance 616, i.e., $\tau(d)$ is linear. As can be seen from FIG. 6, although the DL part 610 of the aggressor BS 604 (A) is delayed, it does not enter the UL region or UL part 612 of the victim BS 602 (V) due to the GP 608 used.

The terminology victim BS and aggressor BS may be signal-specific. The victim BS can also act as an aggressor BS and vice versos, e.g., since channel reciprocity exists between the neighboring BSs 602 and 604.

The TDD pattern 606 is structured on the level of slots and/or symbols according to an UL-DL configuration, i.e., a TDD UL-DL pattern or briefly UL-DL pattern, which is also referred to by the reference sign 606. In TDD, some subframes and/or some slots are allocated for UL transmissions and some subframes and/or some slots are allocated for DL transmissions. The switching between UL and DL occurs in a so-called special subframes (e.g., in LTE) or flexible slots (e.g., in NR), which are generically referred to as TDD DL-UL switch point or briefly DL-UL switch point.

In LTE allows for seven different UL-DL configurations, e.g., according to the Table 4.2-2 in the 3GPP document TS 36.211, version 15.4.0, and/or the table below.

| UL-DL configuration | DL-to-UL switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The OFDM symbols in a subframe and/or the subframes 508 are labeled (or classified) by "D" for DL, "S" for special or "U" for uplink.

The size of the GP 608 and, hence, the number of symbols for a Downlink Pilot Timeslot (DwPTS), i.e. a DL transmission in a special subframe, or an Uplink Pilot Timeslot (UpPTS), i.e., an UL transmission in a special subframe, can also be configured from a set of possible selections.

NR on the other hand provides many different UL-DL configurations. Each radio frame has a duration of 10 ms. There are 10 to 320 slots 508 per radio frame depending on the SCS. The OFDM symbols in a slot and/or the slots 508 are labeled (or classified) by "D" for DL, "X" for flexible or "U" for uplink. A semi-static TDD UL-DL configuration (i.e., a semi-static TDD UL-DL pattern 606) may be used where the TDD configuration is RRC configured using the IE TDD-UL-DL-ConfigCommon:

```
TDD-UL-DL-ConfigCommon ::=    SEQUENCE {
   -- Reference SCS used to determine the time domain boundaries in the UL-DL pattern
 which must be common across all subcarrier specific
      -- virtual carriers, i.e., independent of the actual subcarrier spacing using for data
 transmission.
      -- Only the values 15 or 30 kHz (<6GHz), 60 or 120 kHz (>6GHz) are applicable.
      -- Corresponds to L1 parameter 'reference-SCS' (see 38.211, section FFS_Section)
      referenceSubcarrierSpacing          SubcarrierSpacing                OPTIONAL,
      -- Periodicity of the DL-UL pattern. Corresponds to L1 parameter 'DL-UL-transmission-
 periodicity' (see 38.211, section FFS_Section)
      dl-UL-TransmissionPeriodicity       ENUMERATED {ms0p5, ms0p625, ms1, ms1p25, ms2,
 ms2p5, ms5, ms10}                        OPTIONAL,
      -- Number of consecutive full DL slots at the beginning of each DL-UL pattern.
      -- Corresponds to L1 parameter 'number-of-DL-slots' (see 38.211, Table 4.3.2-1)
      nrofDownlinkSlots                   INTEGER (0..maxNrofSlots)
 OPTIONAL,
      -- Number of consecutive DL symbols in the beginning of the slot following the last
 full DL slot (as derived from nrofDownlinkSlots).
```

-- If the field is absent or released, there is no partial-downlink slot.
-- Corresponds to L1 parameter 'number-of-DL-symbols-common' (see 38.211, section FFS_Section).
    nrofDownlinkSymbols          INTEGER (0..maxNrofSymbols-1)      OPTIONAL, --
Need R
-- Number of consecutive full UL slots at the end of each DL-UL pattern.
-- Corresponds to L1 parameter 'number-of-UL-slots' (see 38.211, Table 4.3.2-1)
    nrofUplinkSlots              INTEGER (0..maxNrofSlots)         OPTIONAL,
-- Number of consecutive UL symbols in the end of the slot preceding the first full UL slot (as derived from nrofUplinkSlots).
-- If the field is absent or released, there is no partial-uplink slot.
-- Corresponds to L1 parameter 'number-of-UL-symbols-common' (see 38.211, section FFS_Section)
    nrofUplinkSymbols           INTEGER (0..maxNrofSymbols-1)
    OPTIONAL   -- Need R That is, e.g., independent of details of the radio access technology (such as LTE or NR), a TDD periodicity of P ms is defined or configured. Furthermore, it can be (e.g., arbitrarily) configured how many DL and UL slots or DL and UL symbols are fitted into the TDD periodicity. Moreover, the size of the GP may be configured. Optionally, it's possible to configure two concatenated periodicities $P_1$ and $P_2$, each with a separate number of DL-UL slots or UL-DL pattern, so as to create a total TDD periodicity of $P_1+P_2$ ms.

Herein, "configured" may encompass that the corresponding is defined by the BS or the network and/or transmitted to the radio device 614 in control signalling (e.g., SSB or RRC signaling).

In NR, a periodicity of a System Information Block (SSB) is fixed to the allowed values, e.g., including 5 ms, 10 ms, 20 ms, 40 ms, 80 ms and 160 ms. Since the SSBs in initial access procedures have a default periodicity of 20 ms, all TDD periodicities must divide 20 ms evenly. For non-concatenated TDD periodicities, the value range for P is {0.5, 0.625, 1, 1.25, 2, 2.5, 3, 4, 5, 10} ms, which all except for the value of 3 ms (which is then not allowed to be selected for a non-concatenated TDD periodicity, only as part of a concatenated TDD periodicity) divide 20 ms evenly. For concatenated TDD periodicities, this puts constraint on which periodicities $P_1$ and $P_2$ that can be configured.

Alternatively or in addition to a semi-static TDD pattern 606, the slot format can be dynamically indicated with a Slot Format Indicator (SFI) conveyed with downlink control information (DCI), e.g., DCI Format 2_0. Regardless of whether a dynamic or semi-static TDD configuration is used in NR, the number of UL and DL slots as well as the GP 608 (e.g., the number of UL and DL symbols in the one or more flexible slots) may be almost arbitrarily configured within the TDD periodicity. This allows for very flexible UL-DL configurations.

A ducting event, e.g. the occurrence of an atmospheric duct, is typically temporary and/or intermittent. The ducting event may have a time duration from a couple of minutes to several hours.

Combining the knowledge of the TDD UL-DL configuration and the presence of an atmospheric duct, the distance 616, d, in FIG. 6, at which an aggressor BS 604 may interfere a victim BS 602, is greatly increased. Since the ducting phenomenon is typically appearing in certain parts of the world under certain conditions, this has not been considered in designs of cellular systems using unpaired spectrum.

Figure 7:
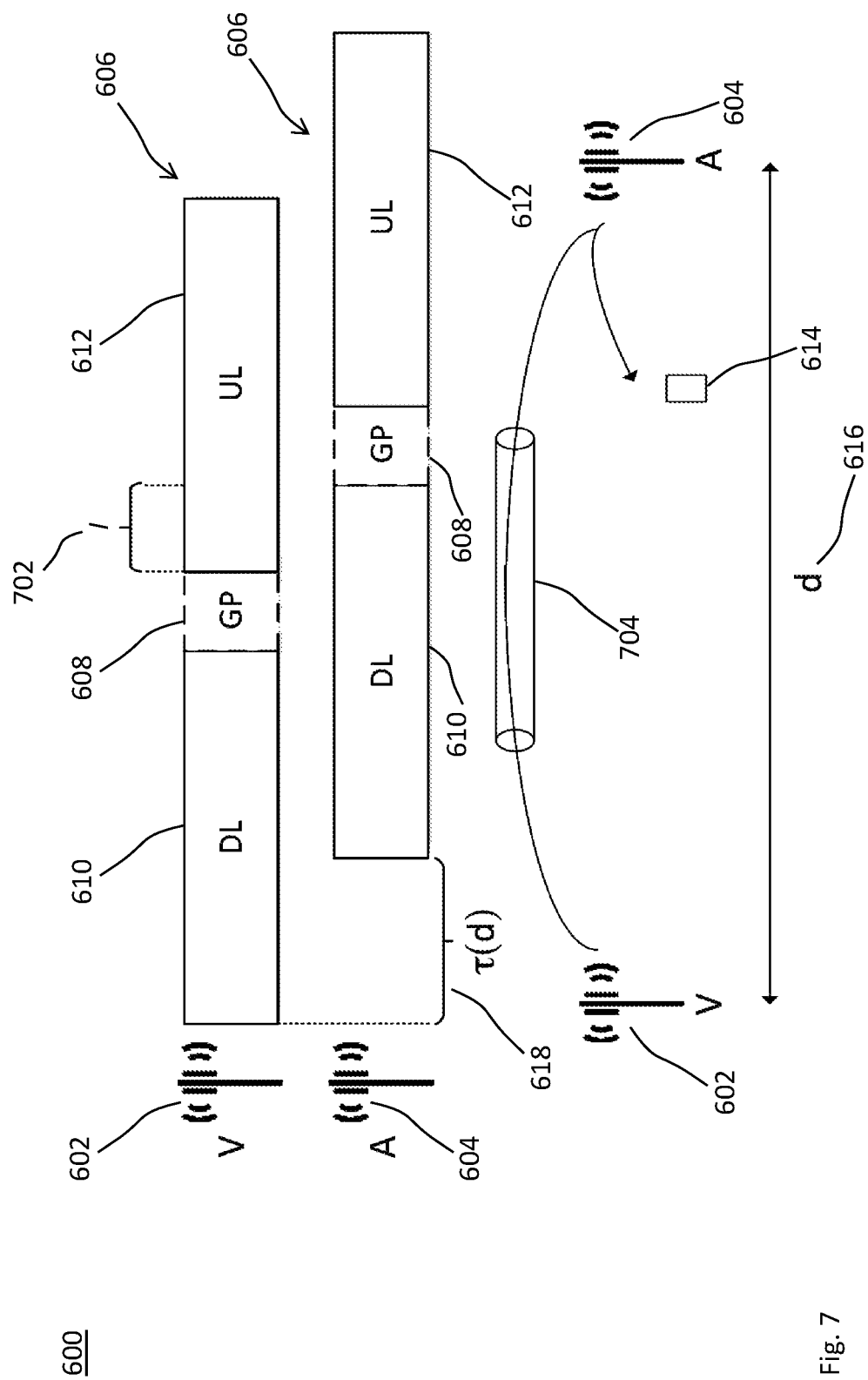
FIG. 7 schematically illustrates a second example of a network environment for implementing the devices of FIGS. 1 and 2.

FIG. 7 schematically illustrates a radio environment 600 comprising interference 702, labeled I, from a DL part 610 of the BS 604 into an UL region 612 of the BS 602. The implication of ducting 704 is that a DL transmission 610 can suddenly enter the UL region 612 as interference 702 with an interference power I, which is illustrated in FIG. 7.

FIG. 7 illustrates a single radio link, but when the atmospheric ducting 704 occurs, a BS 602 can be interfered by a plurality (e.g., hundreds or thousands) of BS 604. The closer the aggressor BS 604, the shorter the propagation delay, and the stronger the interference. Hence, the interference experienced at the victim BS 604 typically has a slope characteristic, as schematically illustrated in FIG. 8.

Figure 8:
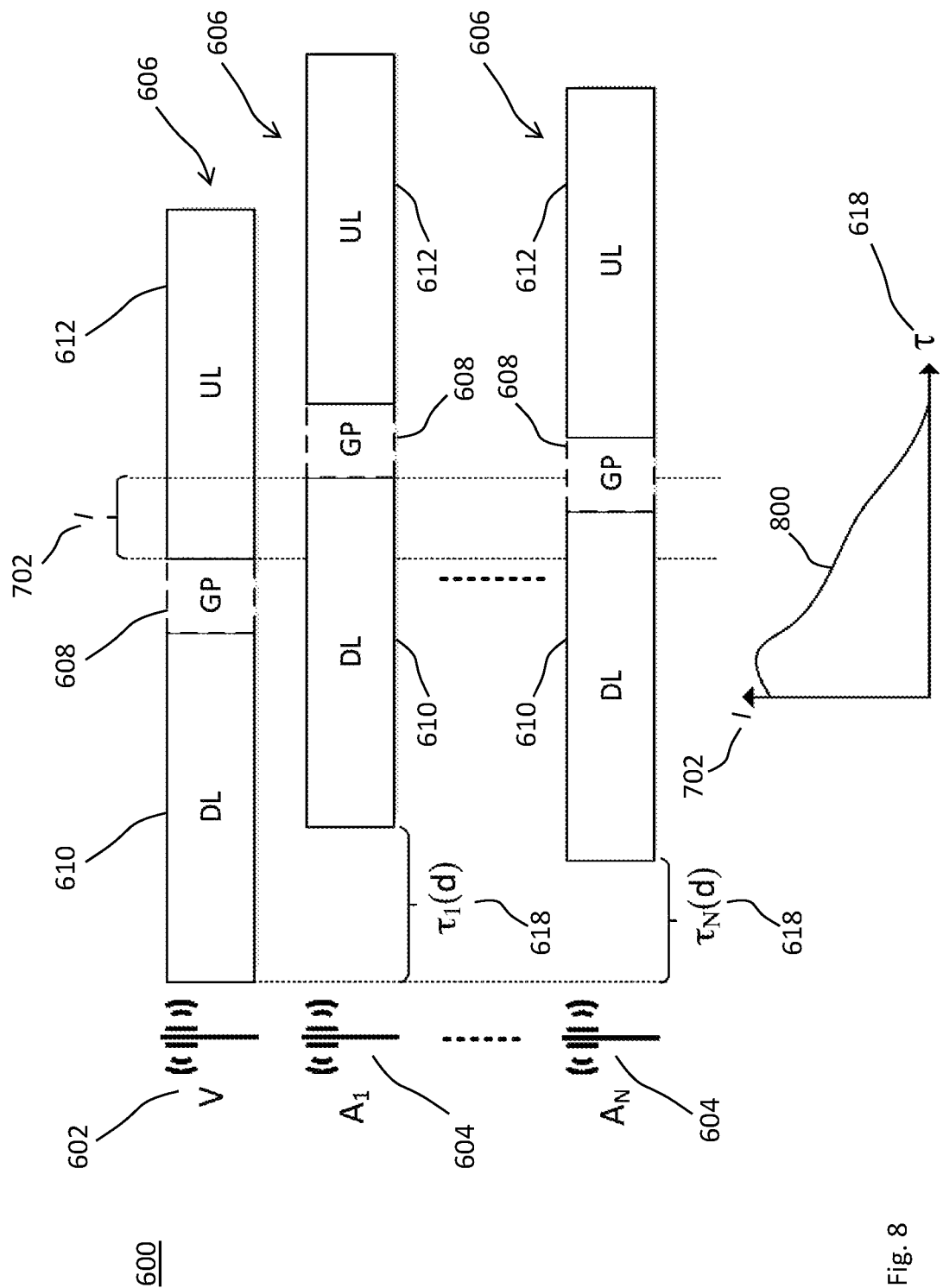
FIG. 8 schematically illustrates a third example of a network environment for implementing the devices of FIGS. 1 and 2.

FIG. 8 schematically illustrates interference characteristics in case of DL to UL interference as a superposition of a plurality of interferers 602.

It should be noted that although the interference problem, i.e., RI, is described to stem from atmospheric ducting, the same situation can occur in a network for which a too small GP 608 has been configured for the deployment. Hence, the technique is described in the context of ducting for clarity and is readily applicable to other case.

The victim BS 602 may detect that it is being interfered (e.g., due to atmospheric ducting 704) based on the time-pattern 800 of the interference 702 (e.g., the slope characteristic), which is generically referred to as RI characteristic 800.

One means to detect, indicate and/or mitigate interference between BSs 602 and 604 is for the victim BS 602 to transmit a specific reference signal that can be detected by an aggressor BS 604. The aggressor BS 604 may, responsive to receiving the specific reference signal, adapt its transmission to avoid the interference situation. One such adaptation is, for example, to blank its DL transmission, effectively increasing the GP 608.

It can be noted that due to channel reciprocity, it is likely that an aggressor 604 is also the victim of other BSs transmission as well, i.e., a further embodiment of the BS 602.

Figure 9:
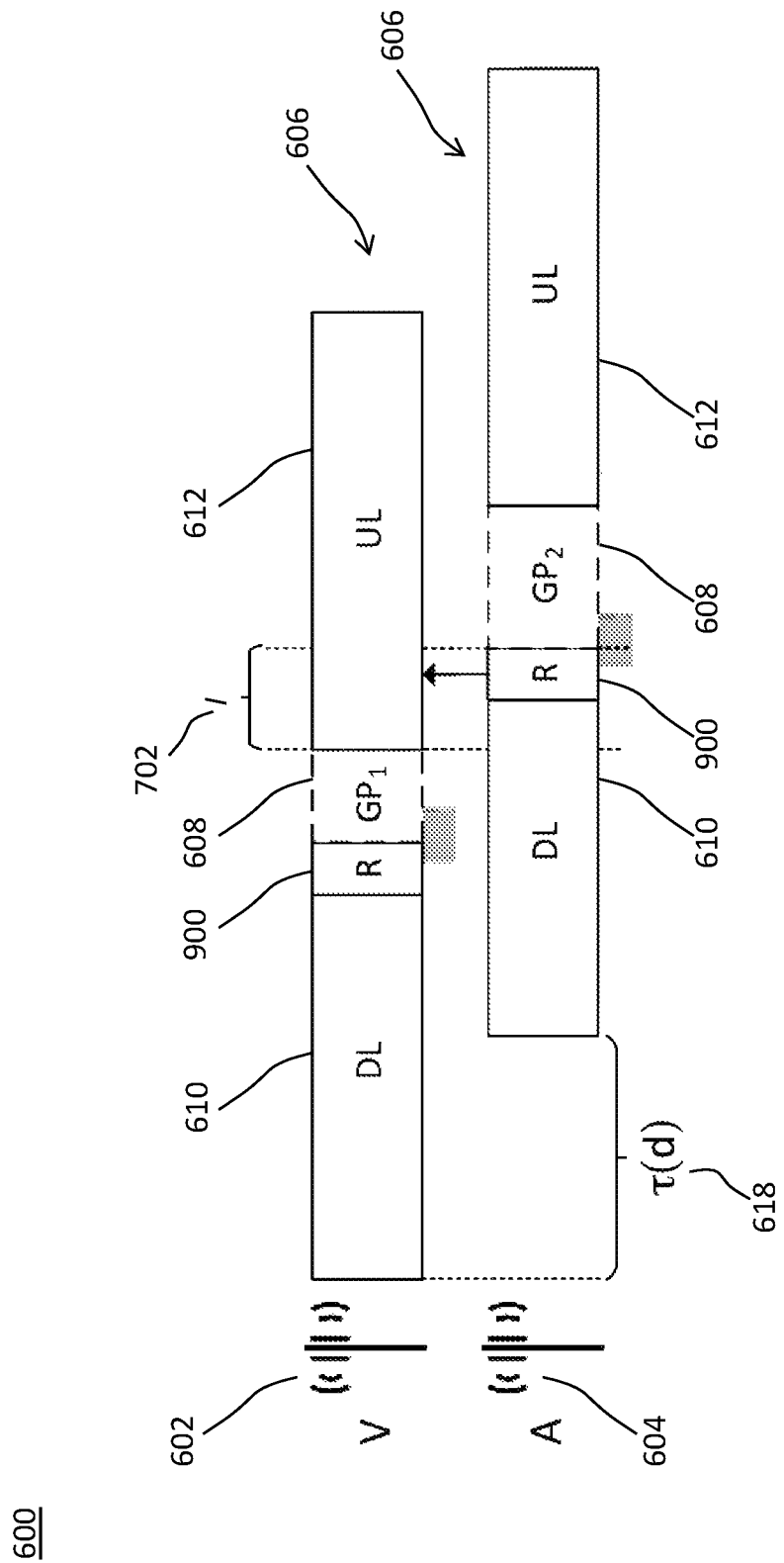
FIG. 9 schematically illustrates a fourth example of a network environment for implementing the devices of FIGS. 1 and 2.

FIG. 9 schematically illustrates a transmission of the specific reference signal 900, e.g., a RIM-RS transmission.

The remote interference (RI) may be resolved according to a RI management (RIM) framework, which is generically referred to by reference sign 1000. The RIM framework may also be referred to as a RIM process.

Figure 10:
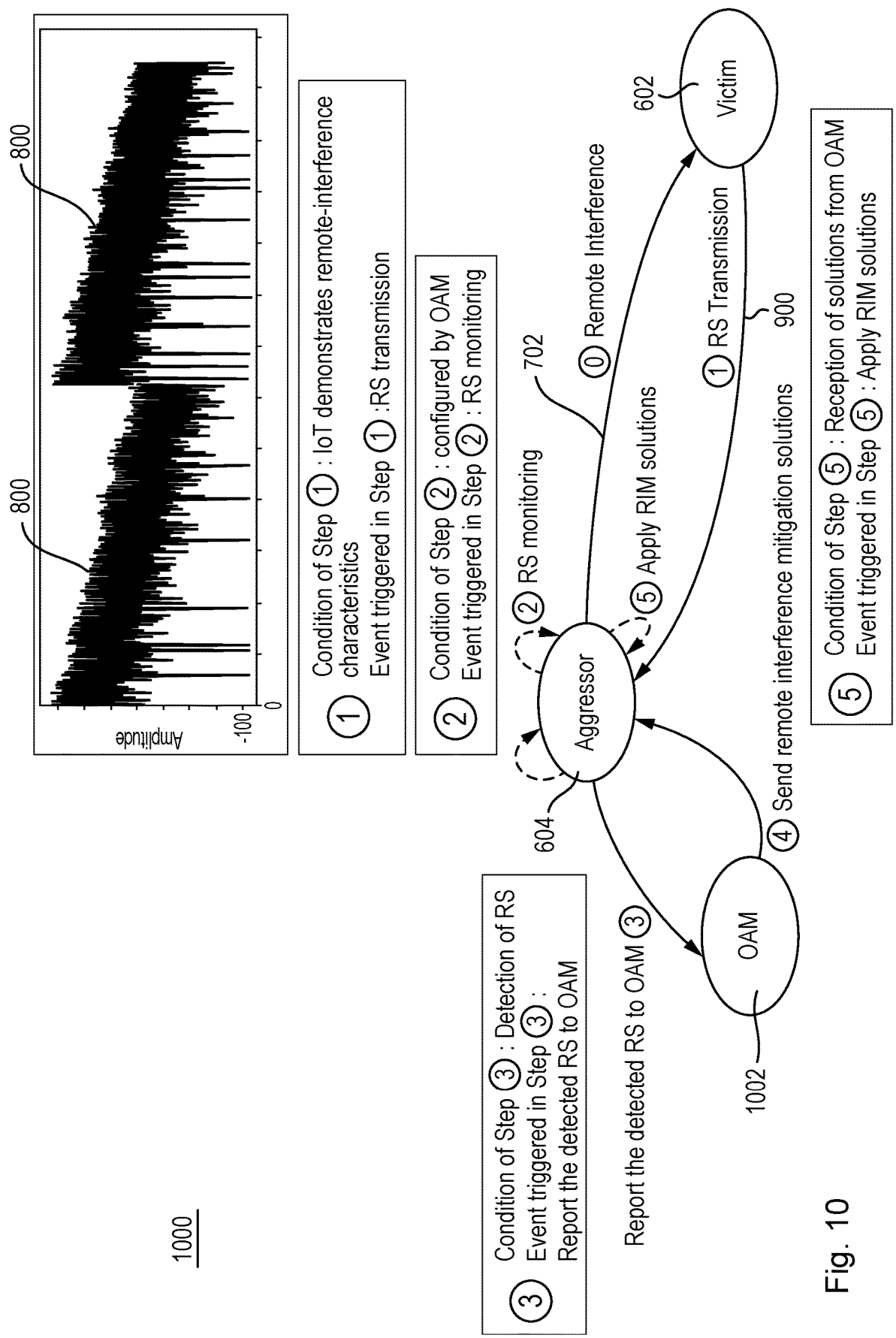
FIG. 10 schematically illustrates a first example of a handling the remote interference using embodiments of the devices of FIGS. 1 and 2.

FIG. 10 schematically illustrates a RIM framework 1000 for a TDD network implemented according to 3GPP LTE, which is also referred to as TDD-LTE RIM Framework or TD-LTE RIM Framework.

In an existing TD-LTE network, the RIM framework in FIG. 10 has been used to cope with the RI 702. As shown in FIG. 10, TD-LTE RIM framework 1000 is not self-adaptive.

The stop of RIM-RS transmission, the triggering and stop of RIM-RS monitoring, the triggering and stop of applications of the remote interference mitigation solutions all rely on manual intervention through an Operations And Management (OAM) functionality or OAM node 1002.

Under the RIM framework 1000 illustrated in FIG. 10, the start and stop of the RIM-RS and corresponding remote interference mitigation schemes cannot happen in time, causing degradation of both network performance and efficiency.

Further examples of RIM frameworks are described, particularly in the context of an NR. In order to minimize or eliminate manual intervention during the RIM process, and/or increase the effectiveness and efficiency of the RIM process, adaptive frameworks for enabling coordination between the BSs 602 and 604 (i.e., the network nodes) involved in the RI 702 were studied for a 3GPP Release 16 NR RIM study item. The outcome of the study item has been documented in the 3GPP document TR 38.886, version 16.0.0.

The coordination between the victim BS 602 and aggressor BS 604 (e.g., gNBs) may comprise a combination of over-the-air (OTA) and backhaul messaging or may comprise OTA messaging only. Therefore, besides the LTE-like centralized RIM framework (e.g., the Framework-0 specified in the 3GPP document TR 38.886, version 16.0.0), two adaptive RIM frameworks were agreed in 3GPP. A first adaptive framework solely relies on OTA signaling, e.g., according to the Framework-1 in the 3GPP document TR 38.866, version 16.0.0. A second adaptive framework combines OTA and backhaul signaling, e.g., according to the Framework-2.1 in the 3GPP document TR 38.866, version 16.0.0.

The frameworks that have been agreed for NR are described below with reference to FIGS. 11 to 13, respectively.

Figure 11:
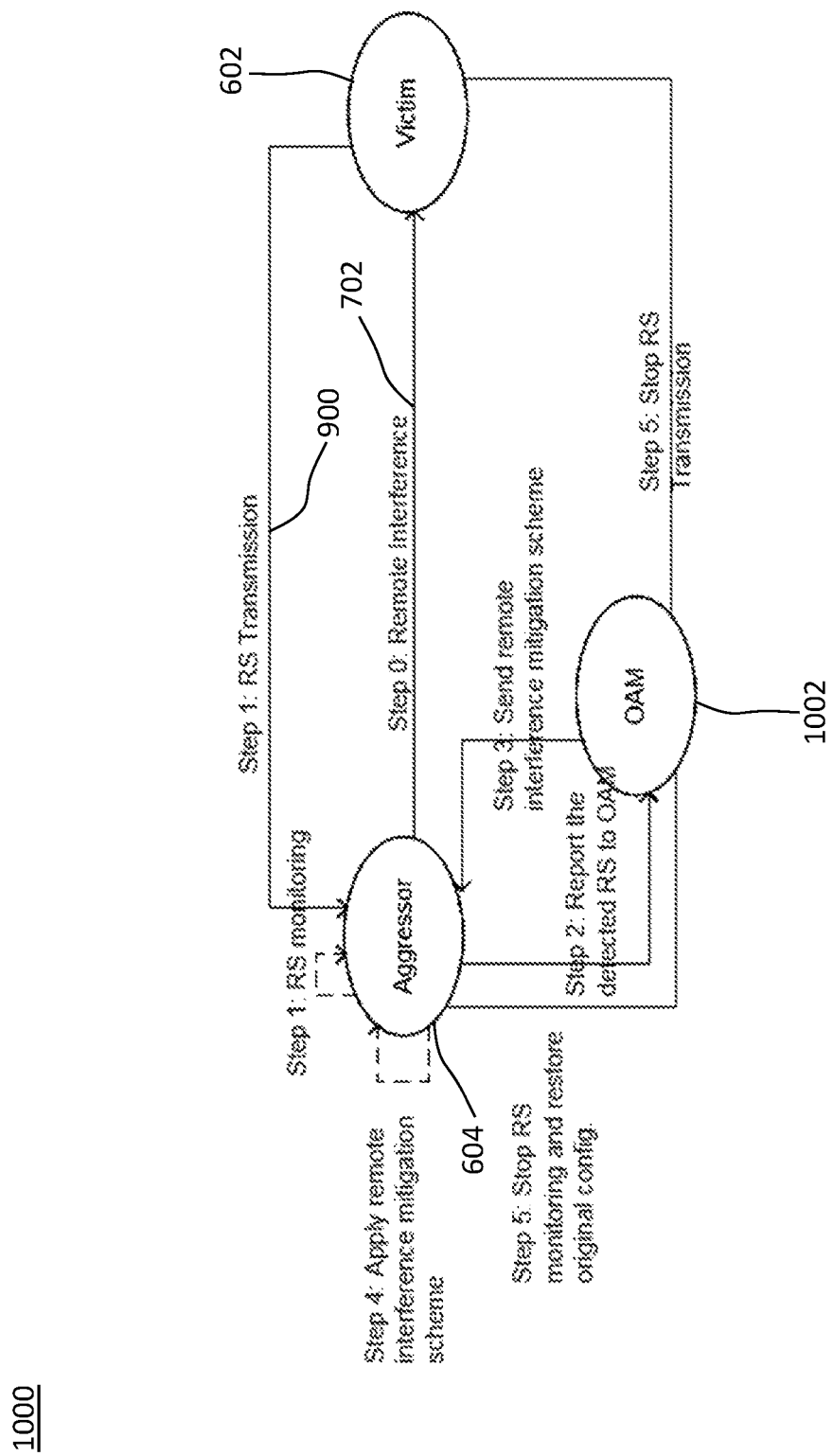
FIG. 11 schematically illustrates a second example of a handling the remote interference using embodiments of the devices of FIGS. 1 and 2.

FIG. 11 schematically illustrates a centralized RIM framework, e.g., according to the RIM Framework-0.

The RIM process of the Framework-0 comprises at least one of the following steps. Corresponding steps performed at the victim BS 602 and the aggressor BS 604 are described in combination for clarity and not limitation to a system method.

In a step 0, the RI 702, e.g., an atmospheric ducting phenomenon, happens. That is, the RI 702 appears.

In a step 1:
Victim BS 602 detects RI characteristic 800 (e.g., experiences "sloping" like IoT increase) and starts transmission and/or monitoring of the specific RS 900.
Aggressor starts monitoring RS as configured by OAM 1002
Step 2: Upon reception of RS, Aggressor reports the detected RS to OAM
Step 3: OAM sends remote interference mitigation scheme to Aggressor
Step 4: Aggressor applies remote interference mitigation scheme
Step 5: OAM stops RS monitoring and restores original configuration at aggressor side and stop RS transmission at victim side when the ducting stops.

Figure 12:
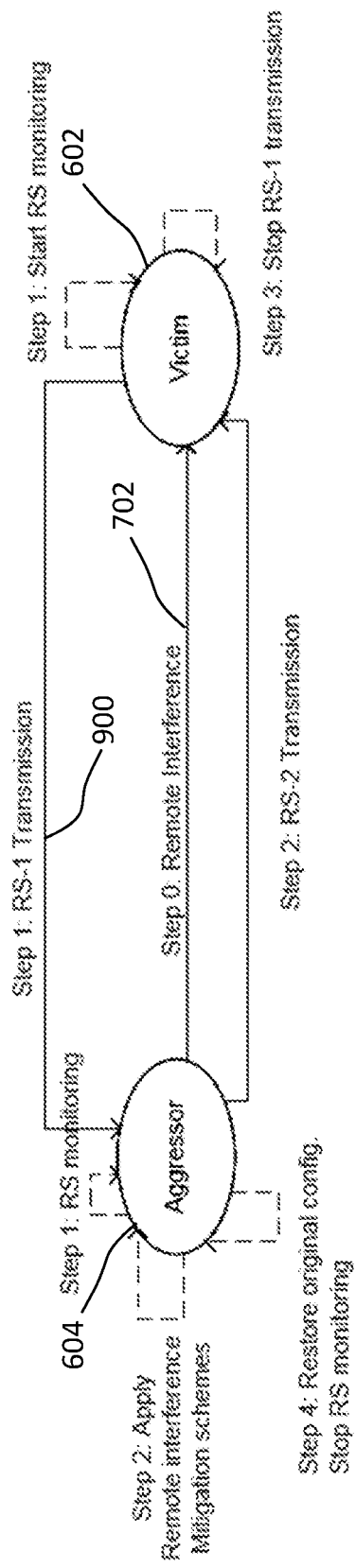
FIG. 12 schematically illustrates a third example of a handling the remote interference using embodiments of the device of FIG. 1.
Figure 13:
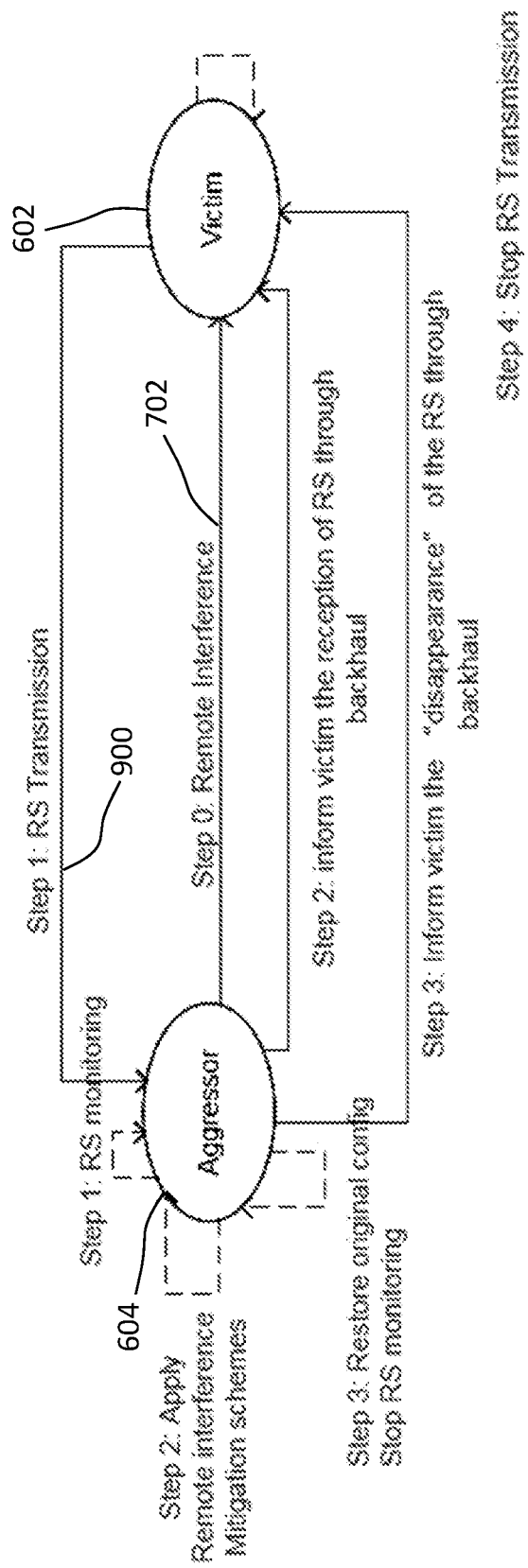
FIG. 13 schematically illustrates a fourth example of a handling the remote interference using embodiments of the device of FIG. 1.

FIG. 12 schematically illustrates an adaptive RIM framework, e.g., according to the RIM Framework-1. The adaptive RIM framework is solely relying on OTA.

The RIM process of the Framework-1 comprises at least one of the following steps. Corresponding steps performed at the victim BS 602 and the aggressor BS 604 are described in combination for clarity and not limitation to a system method.

In a step 0, the RI (e.g., due to an atmospheric ducting phenomenon) happens. That is, the RI appears.

Step 1:
Victim BS 602 detects RI characteristic 800 (e.g., experiences "sloping" like IoT increase) and starts transmission and/or monitoring of the specific RS 900.
The specific RS 900, e.g., marked as RS-1, is used to assist the one or more aggressor BSs 604 to recognize that they are causing RI 702 to the victim BS 602 and/or to detect or deduce how many UL radio resources of the victim BS 602 are impacted by the one or more aggressor BS 604.
Aggressor BS 604 starts monitoring the specific RS 900 as configured by OAM and/or when it detects the RI characteristic 800 (e.g., experiences RI with "sloping" IoT increase).

In a step 2, upon reception of the special RS 900 (labeled RS-1) from the victim BS 602, the aggressor BS 604 starts a remote interference mitigation (RIM) solutions, e.g., by muting some DL transmission symbols. Furthermore, the aggressor BS 604 transmits a special RS 900 to inform the victim BS 602 that a cause of the RI (e.g., the atmospheric ducting phenomenon) still exist. This special RS 900 (labelled as RS-2) is used to assist the victim BS 602 to decide whether cause of the RI (e.g., the atmospheric ducting phenomenon) still exist. It does not preclude the possibility of using RS-2 for other purposes, pending on further study.

In a step 3, the victim BS 602 continues transmission of the special RS 900 (i.e., the RS-1), if the special RS 900 from the aggressor BS 604 (i.e., the RS-2) is detected. The victim BS 602 may stop the transmission of the special RS 900 (i.e., the RS-1), the special RS 900 from the aggressor BS 604 (i.e., the RS-2) is not detected and/or if the RI characteristic 800 (e.g., the IoT slope) is going back to certain level.

In a step 4, the aggressor BS 604 continues remote interference mitigation (e.g., performing a RIM solution) while (e.g., as long as) receiving the special RS (i.e., the RS-1) from the victim BS 602. Upon disappearance of the RS-1 (e.g., as soon as the RS-1 is not received), the aggressor BS restores an original configuration (e.g., the UL-DL configuration used prior to receiving the RS-1).

The special RS 900 transmitted from the victim BS 602 and the aggressor BS 604, e.g., the RS-1 and RS-2, respectively, may serve or carry different functionalities, special RS 900 may or may not have different structures. For example, the RS 900 may only depend on an identifier (ID) of the respective BS 602 and 604 and/or may use a common design for RS-1 and RS-2.

The handling in the step 304 may be performed according to a Framework-2.1. FIG. 13 schematically illustrates such an adaptive RIM framework relying on both OTA and backhaul.

The handling 304 and the transmitting 404 may be implemented according to the Framework-2.1, which may comprise at least one of the following steps.

Step 0: Atmospheric ducting phenomenon happens, and the remote interference appears.

Step 1:
The victim BS 602 detects the RI characteristic 800 (e.g., experiences "sloping" like IoT increase) and start transmission of the special RS 900, e.g., the RIM-RS.

A set of BS 602 (e.g., gNBs) may use the same RS, which may carry an identifier (ID) for the set (i.e., a set ID).

The aggressor BS 604 starts monitoring the special RS 900 as configured by OAM or when it experiences remote interference with "sloping" IoT increase.

Step 2: Upon reception of RS, Aggressor informs the set of victim gNB(s) the reception of RS through backhaul and apply interference mitigation scheme Message exchange in Step 2 could include other information, pending on further study.

Step 3: Upon "disappearance" of RS, Aggressor informs the set of Victim gNB(s) the "disappearance" of RS through backhaul and restore original configuration.

Step 4: Victim stop RS transmission upon the reception of the "disappearance of RS" info through backhaul The RIM-RSs may, e.g., in any of the NR RIM frameworks, may fulfill or initiate the following functionalities (e.g., basic functions) summarized in below table.

| Framework | RS type | Functions |
| --- | --- | --- |
| Framework 0 | RS sent by victim (RS-1) | 1/Being able to provide information whether the atmospheric ducting phenomenon exists<br>2/Being able to assist the aggressor to identify how many UL OFDM symbols at victim it impacted. |
| Framework 1 | RS-1 sent by victim | 1/Being able to provide information whether the atmospheric ducting phenomenon exists<br>2/Being able to assist the aggressor to identify how many UL OFDM symbols at victim it impacted. |
| | RS-2 sent by aggressor | 1/Being able to provide information whether the atmospheric ducting phenomenon exists |
| Framework 2.1 | RS sent by victim (RS-1) | 1/Being able to assist the aggressor to identify how many UL OFDM symbols at victim it impacted.<br>2/Being able to carry enough information to enable the information exchange through backhaul (e.g.: set ID). |

The above one or more RIM-RSs 900 can be designed in a unified way in terms of sequence type, time and frequency transmission pattern, irrespective of framework chosen, to convey information for gNB (or gNB set) identification. It should be noted that the initial step in victim-aggressor communication, e.g., RIM RS-1 transmission, must be executed OTA regardless of which RIM framework is used, to enable identification of the victim (set) by an aggressor (set). For the adaptive frameworks, e.g. framework 1 and framework 2.1, after the aggressor (set) has identified the gNB/gNB-set ID from the RS-1 received and identified the victim (set), the coordination may proceed OTA (via RS-2) or over the backhaul.

At the same time, a victim BS 602 (e.g., a gNB) or a set of victim BS 602 (e.g., a gNB-set) can also use the RIM RS-1 900 to convey information, e.g. including either "Enough mitigation, no further actions needed" or "Not enough mitigation, further actions needed".

Examples of a configuration of the 3GPP RIM RS 900 may include at least one of the following features. To convey the gNB set ID information, the RIM RS transmission resources should be distinguishable. The following methods are supported to distinguish RIM-RS resources:

TDM method: different time-domain occasions are used to distinguish RIM-RS resource;

FDM method: different frequency positions are used to distinguish RIM-RS resource;

CDM method: different RS sequences are used to distinguish RIM-RS resource.

Therefore, in NR, a basic RIM-RS resource 1402 is defined as the time resource, the frequency resource and the sequence ID used for a transmission of the RIM-RS 900. Each basic RIM-RS resource 1402 is uniquely indexed. All configured basic RIM-RS resources 1402 have the same bandwidth and the same SCS.

Any of the base stations 602 and/or 604 (e.g., a gNB) may be configured with multiple set IDs. For each set ID, the respective base station (e.g., a gNB) may be configured to be associated to one or multiple RIM-RS resources 1402. The mapping of a set ID to multiple RIM-RS resources is supported for at least one of the following two main use cases.

A first main use case comprises a repetition of the transmission of the RIM-RS 900 to improve RS detection performance and/or coverage enhancement. The first main use case may provide a repetition functionality.

Figure 14:
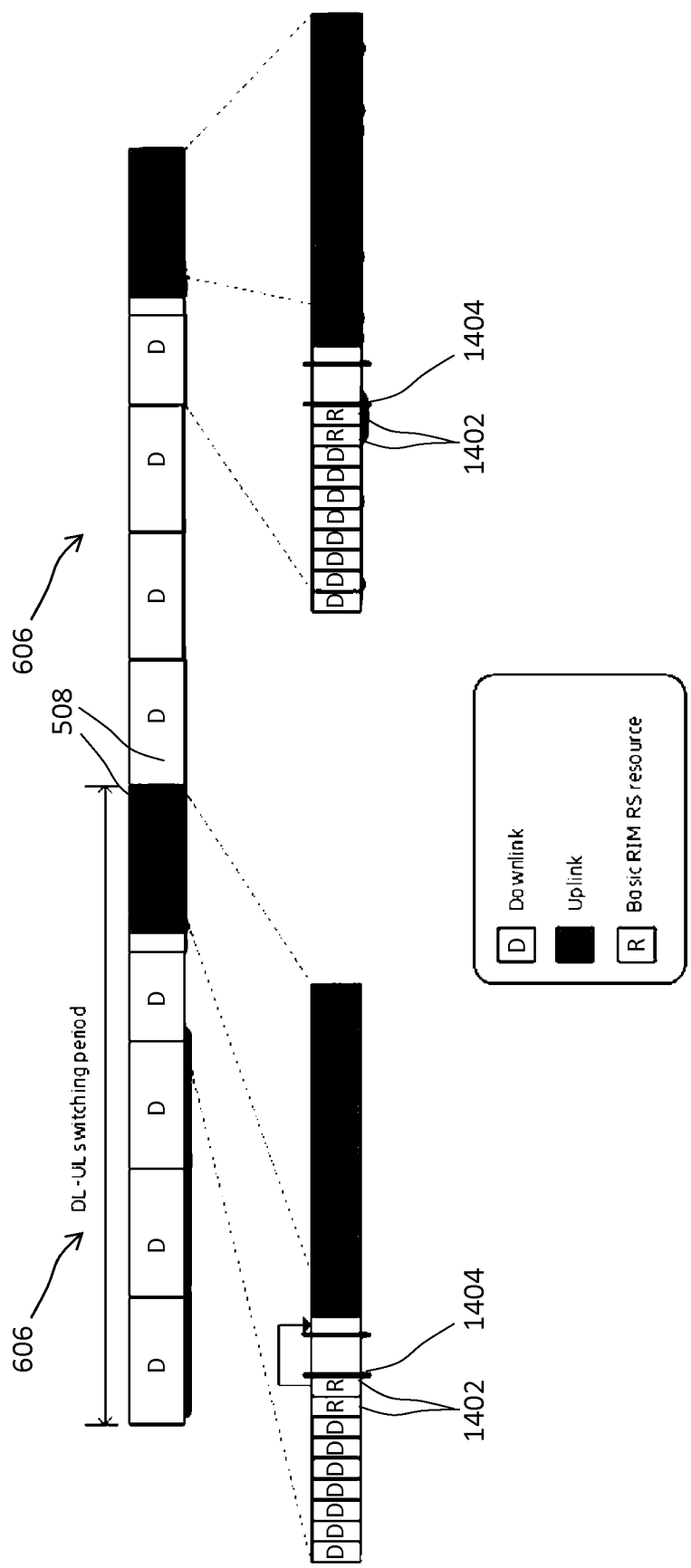
FIG. 14 schematically illustrates a first example of consecutive or concatenated TDD UL-DL patterns used by embodiments of the device of FIG. 1.

FIG. 14 schematically illustrates an example of a TDD pattern 606 for the first main use case. More specifically, two DL-UL switching periods of the TDD pattern 606 are shown. The first main use case comprises an inter-"DL-UL switching period" repetition for coverage enhancement. An example is illustrated in FIG. 14, wherein the basic RS resource 1402 is placed in the same position relative to a 1st reference point 1404, e.g., the UL-DL switching point or the beginning of the special subframe or flexible slot. The NR example illustrated in FIG. 14 shows slots 508 in the upper row, and symbols in the lower row.

The rectangular arrow indicates the one or more symbols in which the RS 900 is received due to the propagation delay (e.g., the delay 618).

The respective base station 602 or 604 (e.g., a gNB) may perform either combination of the received RIM-RS 900 across the two DL-UL switching periods, or, perform multi-shot detection, in order to improve detection performance.

A second main use case comprises different placements of the symbol for the RS 900 relative to the 1st reference point 1404 in different DL-UL switching periods in order to account for different propagation delay ranges. The second main use case may provide a near-far functionality.

Figure 15:
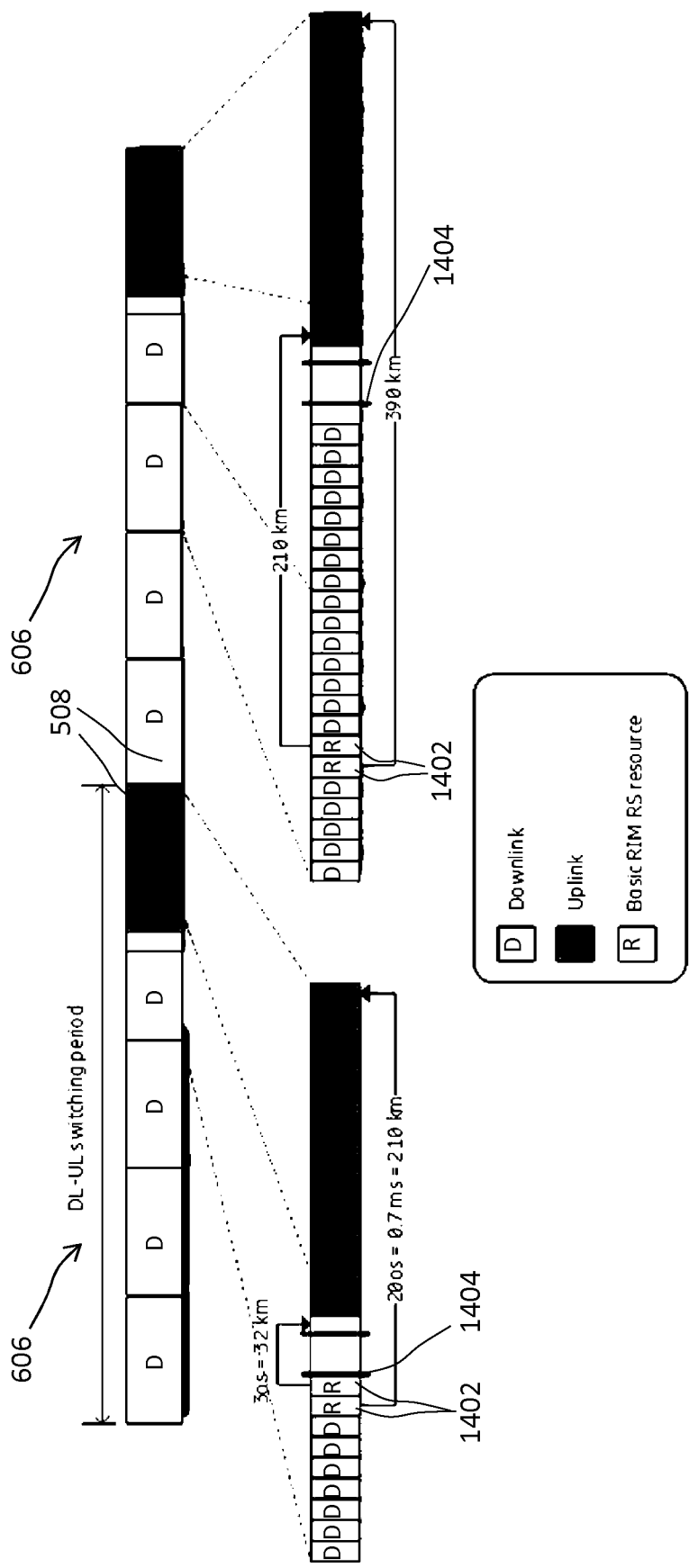
FIG. 15 schematically illustrates a second example of consecutive or concatenated TDD UL-DL patterns used by embodiments of the device of FIG. 1.

FIG. 15 schematically illustrates the second main use case comprising different placements (i.e., different configurations) of the basic RIM-RS resource 1402 for the RIM-RS 900 relative the $1^{st}$ reference point in two consecutive DL-UL switching periods. An example of the second main use case is illustrated in FIG. 15, wherein in the first DL-UL switching period, the RIM RS resource 1402 is placed right before the 1st reference point, enabling it to propagate up to 210 km without falling into the DL part of a receiving base station 602 or 604 (e.g., a gNB). In the second DL-UL switching period, the RIM RS resource is placed in the slot prior to the DL-UL switch point enabling it to fall in to the UL symbols of a receiving base stations 602 or 604 (e.g., gNBs) with a propagation distance 210 km to 390 km away from the transmitting base station 602 or 604.

If a set ID is configured to be mapped to multiple RIM-RS resources, then, these RIM-RS resources differ only in the time domain. And these multiple basic RIM-RS resources can be configured only in consecutive TDD DL-UL switching periods, with one basic RIM-RS resource per TDD DL-UL switching period.

Regarding the time-domain pattern for the RIM RS 900, a global RIM-RS transmission periodicity may be defined. The transmission periodicity may be semi-statically configured per network. The transmission periodicity may be based on all required RIM RS-1 resources and all required RIM RS-2 resources. The global RIM-RS transmission periodicity may be a multiple of the periodicity of the TDD DL-UL pattern if only one TDD pattern 606 is configured, or a multiple of the combined periodicity if two TDD DL-UL patterns 606 are configured.

The method 300 may be performed with or without any of the aforementioned features and/or in the context of any of the aforementioned TDD UL-DL configurations, UL-DL patterns 606 and/or RIM frameworks 1000.

Alternatively or in combination, the method 300 may determine in the step 302 the set according to any of the below embodiments. The set may also be referred to as a candidate resource set. The step 302 of determining the set may also be referred to as a candidate resource set formation.

In a first embodiment, a candidate RIM-RS resource set is defined in the step 302 as a (e.g., proper) subset of all possible RIM-RS resources (e.g., the resources 1402). The possible RIM-RS resources may encompass one (e.g., possible) RIM-RS resource time occasion per TDD DL-UL switch point. The RIM-RS transmission is only allowed on the candidate RIM-RS resources according to the step 304.

Whenever an embodiment or implementation of the step 302 is described as to how to define a candidate resource set on which RIM-RS transmission 304 is allowed (i.e., using a positive definition of the set or by defining a positive set), the technique is readily implemented to define a set of resources on which the RIM-RS transmission 304 is not allowed (i.e., using a negative definition of the set or by defining a negative set).

In a second embodiment, which is combinable with the first embodiment, the candidate resource set is formed by including all the possible RIM-RS resources in one out of two consecutive TDD patterns, if two concatenated or consecutive TDD patterns are configured in the network.

In any embodiment, the one or more TDD patterns 606 may refer to or may be defined by one or more semi-static TDD patterns configured by system information block 1 (SIB1). Alternatively or in addition, the one or more TDD patterns 606 may refer to or may be defined one or more reference TDDs pattern comprised in a RIM-RS transmission and/or reception configuration which is configured to the gNB 602 and/or 604 by the OAM 1002 or another configuring management or network node. Typically though, even if such reference TDD pattern(s) are independently configured, they would likely be configured to be the same as the TDD pattern(s) signaled in SIB1.

An first example of the second embodiment, the candidate resource set is formed by including all possible RIM-RS resources in the TDD pattern, which has a longer uplink duration. As another example, the candidate resource set is formed by including all possible RIM-RS resources in the TDD pattern that has a longer duration of the flexible and the UL resources.

In a third embodiment, the candidate resource set is formed by including all possible RIM-RS resources within a certain time duration and repeating it according to a periodicity. For instance, the candidate RIM-RS resource set includes the possible RIM-RS resources in every two TDD patterns within a global RS transmission periodicity, regardless if the network is configured with one TDD pattern or two concatenated TDD patterns.

Figure 16:
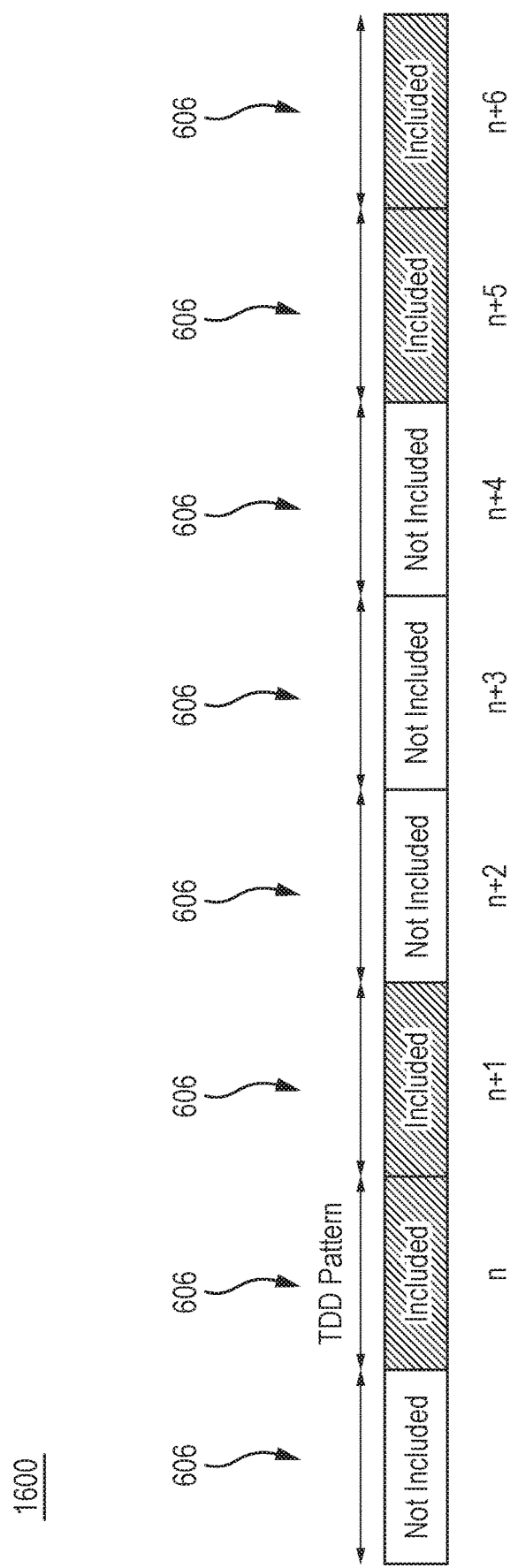
FIG. 16 schematically illustrates a first example of a set of radio resources usable by embodiments of the devices of FIGS. 1 and 2.

An example of the third embodiment is illustrated in FIG. 16, wherein the candidate RIM-RS resource set 1600 is formed by including two consecutive RIM-RS resources (in consecutive TDD patterns) and repeating it every $5^{th}$ TDD pattern.

Figure 17:
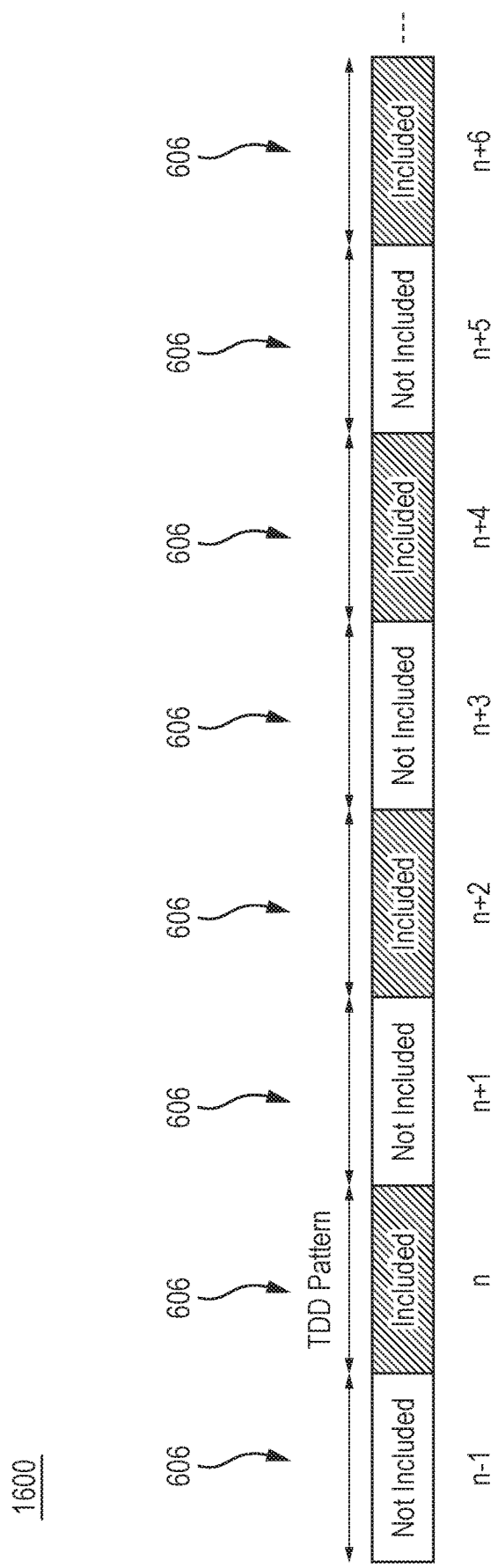
FIG. 17 schematically illustrates a second example of a set of radio resources usable by embodiments of the devices of FIGS. 1 and 2.

In a fourth embodiment, an example of which is illustrated in FIG. 17, the candidate resource set 1600 is formed by including every N-th RIM-RS resource from the possible RIM-RS resources, for instance every other RIM-RS resource (i.e. N=2). In FIG. 17, every other possible RIM-RS resource is included in the candidate resource set.

Alternatively or in combination with any of the aforementioned embodiments, the set may be determined in the step 302 based on one or more conditions, e.g., for candidate resource set formation 302.

In a fifth embodiment, the candidate resource set is formed in the step 302 by including the possible RIM-RS resources that meet one or more certain conditions. Any two or all of the below examples may be combinable.

A first example of the fifth embodiment comprises an UL time duration condition. The possible RIM-RS resources in a TDD pattern are included in the candidate resource set, if the UL duration of the TDD pattern is greater than or equal to a threshold, or if the duration of the flexible and the UL resources of the TDD pattern is greater than or equal to a threshold. Since the length of the UL duration in the TDD pattern corresponds to the propagation distance for which the RS can be received, it may not be worthwhile to transmit RIM-RS if the UL time duration is too short. Thus, as an example, the threshold is defined such that it corresponds to the typical smallest distance between aggressor gNB-sets and victim gNB-sets.

A second example of the fifth embodiment comprises a RS detection complexity condition. The possible RIM-RS resources within a period of a TDD pattern (i.e., the TDD UL-DL period) are included in the candidate resource set, if the RIM-RS detection complexity after including these resources is kept being smaller than a threshold within a certain period.

For example, let S denote the number of RIM-RS sequences in one TDD DL-UL pattern period. Let N denote the number of possible RIM-RS frequency occasions in the whole network. Then, the RS detection complexity within a TDD DL-UL pattern period can be calculated based on a granularity of the number of sequences for RS detection, i.e., S*N. If the complexity condition is set such that the total number of sequences for RS detection is smaller than S*N within a period corresponding to a combined periodicity of two consecutive TDD patterns, then, it implies that the candidate RIM-RS resource set should be formed by including the possible RIM-RS resources in every second TDD pattern within a global (e.g., equal in the network) RS transmission periodicity.

A third example of the fifth embodiment comprises a TDD pattern duration condition. An implementation option is to not include possible RIM-RS resources in the candidate resource set if the length of the TDD pattern 606, e.g., the length in time (e.g., in ms) and/or in number of slots, is below a threshold. That is, the length of both the UL duration, DL duration and the duration of the flexible resource are taken into account and not only the UL duration. This may be reasonable since the relative amount of resources is a fraction of the available resources in the TDD pattern that have to be reserved for RIM-RS transmission is increased the shorter the TDD pattern is. A short TDD pattern may also typically be configured so that delay-sensitive traffic can be scheduled there (ensuring shorter HARQ-ACK round-trip time, for instance since the time between DL and UL is shorter), and it may not be desirable to have such traffic collide with RIM-RS transmission.

Another implementation option is to have more than one of the above conditions while forming the candidate resource set in the step 302.

The method 300 may be performed selectively or conditionally, e.g., depending on and/or responsive to receiving an indication of determining the set (e.g., the candidate resource set). For example, the step 302 may be performed selectively if (e.g., only if) the indication requires a reduction of the radio resources for RSs 900. The indication may comprise one or more control messages, particularly one or more flags. The indication may be received from the OAM function or node 1002 and/or at the base station 602 or 604 performing the method 300.

In sixth embodiment, two flags are signaled from OAM to network nodes for configuring the RIM-RS resources, wherein a first flag is to indicate whether RIM-RS transmission is allowed in all possible RIM-RS resources or only in the defined candidate resource set, and a second flag to define the candidate RIM-RS resource set.

Below examples and implementations may be combinable.

As an example of the sixth embodiment, if the first flag is configured to 0, then, all possible RIM-RS resources can be used for RIM-RS transmissions, i.e., no candidate RIM-RS resource set is explicitly configured but it is instead assumed that the candidate RIM-RS resource set comprises all possible RIM-RS resources. If the first flag is instead configured to 1, then, only the RIM-RS resources contained in the defined RIM-RS resource set can be used for RIM-RS transmission. When the second flag is set to 0, then, the candidate resource set is formed by including the possible RIM-RS resources in every second TDD DL-UL pattern period within a global RS transmission periodicity, starting from the first TDD period; otherwise, the candidate resource set is formed by including the possible RIM-RS resources in every second TDD DL-UL pattern period within a global RS transmission periodicity, starting from the second TDD period.

In a first implementation of the sixth embodiment, the base stations 602 and/or 604 (e.g., network nodes) only read the second flag parameter when the first flag parameter indicates that RIM-RS transmission is only allowed on the defined candidate resource set (i.e., the first flag is configured to 1 in the example case). When the first flag indicates that all possible RIM-RS resources can be used for RIM-RS transmission (i.e., the first flag is set to 0 in the example case), then, the second flag parameter is not valid.

In a second implementation of the sixth embodiment, when the first flag indicates that all possible RIM-RS resources can be used for RIM-RS transmission (i.e., the first flag is set to 0 in the example case), then, the second flag parameter can be reused for signaling other information to the network nodes. For instance, for indicating the enabling/disabling RIM-RS functionalities, like "enough mitigation" and "not enough mitigation".

In a third implementation of the sixth embodiment, under some network configurations, RIM-RS transmission 302 is allowed on all possible RIM-RS resources, e.g., when the network is configured with only one TDD pattern, or when the network is configured with two concatenated TDD patterns but only one TDD pattern has a DL-UL switch point, etc. Then, the two flags are for signaling other information to the network nodes. For instance, they can be used to indicate "only repetition functionality", "only near-far functionality", or "both repetition and near-far functionality".

In a seventh embodiment, a single flag parameter (corresponding to the second flag of the above two-flag signaling case) is signaled, e.g., from OAM to the base stations 602 and/or 604 (i.e., network nodes) to define the set (e.g., the candidate RIM-RS resource set).

In a first implementation of the seventh embodiment, when the flag is set to 0, then, the candidate resource set is formed by including the possible RIM-RS resources in every second TDD DL-UL pattern period within a global RS transmission periodicity, starting from the first TDD period; otherwise, the candidate resource set is formed by including the possible RIM-RS resources in every second TDD DL-UL pattern period within a global RS transmission periodicity, starting from the second TDD period.

In a second implementation of the seventh embodiment, the flag parameter is configured only when the network is configured with two concatenated TDD patterns, with each TDD pattern having a DL-UL switch point, and it is preferred to not transmit RIM-RS in every possible RIM-RS resource. If the flag is not configured, then, it implies that all possible RIM-RS resources can be used for RIM-RS transmission.

In an eighth embodiment, a single flag parameter (e.g., corresponding to the first flag of any of the above two-flag signaling cases) is signaled from OAM to the base stations 602 and/or 604 (i.e., network nodes) to indicate whether RIM-RS transmission is allowed in all possible RIM-RS resources or only in the defined candidate resource set.

In an implementation of the eighth embodiment, if the first flag is configured to 0, then, all possible RIM-RS resources can be used for RIM-RS transmissions, i.e., no candidate RIM-RS resource set is configured. If the first flag is configured to 1, then, only the RIM-RS resources contained in the defined RIM-RS resource set can be used for RIM-RS transmission.

In a ninth embodiment, two flag parameters are signaled, e.g., from OAM to network nodes, when two concatenated TDD patterns are configured. The first flag corresponds to the first TDD pattern and indicates if RIM-RS resources in the first TDD pattern are included in the candidate resource set (e.g. by setting the flag to '1') or not (e.g. by setting the flag to '0'). The second flag corresponds to the second TDD pattern and indicates if RIM-RS resources in the second TDD pattern are included in the candidate resource set or not. There may be a rule in specification stating that it is not possible to configure both flags to zero (which would imply that no RIM-RS resources are included). That is, only '10', '01', or '11' is possible to configure.

Any of two or more of the above nine embodiments may be combined. Alternatively or in addition, the set (e.g., the candidate resource set) may be determined in the step 302 (e.g., may be formed) by one or more predefined or configured rules or/and one or more predefined or configured conditions, e.g., as discussed above. The conditions and/or rules may be configured by the control message from the OAM function or node 1002

Figure 18:
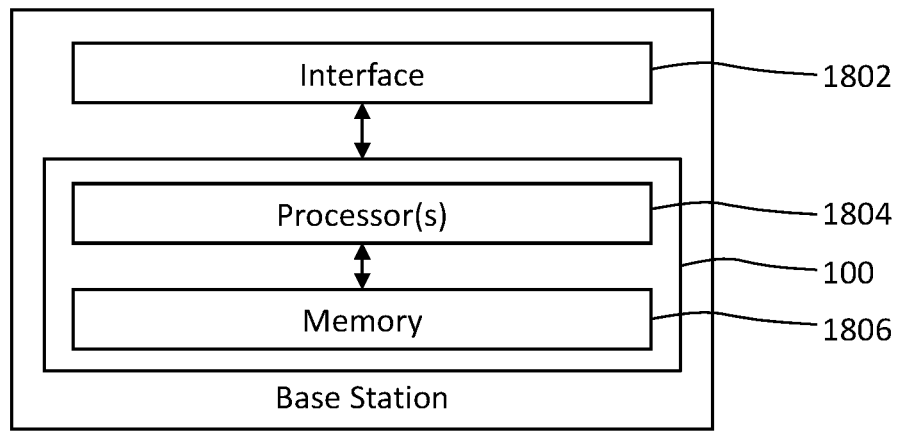
FIG. 18 shows a schematic block diagram of a base station embodying the device of FIG. 1.

FIG. 18 shows a schematic block diagram for an embodiment of the device 100. The device 100 comprises one or more processors 1804 for performing the method 300 and memory 1806 coupled to the processors 1804. For example, the memory 1806 may be encoded with instructions that implement at least one of the modules 102 and 104.

The one or more processors 1804 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1806, base station functionality. For example, the one or more processors 1804 may execute instructions stored in the memory 1806. Such functionality may include providing various features and steps discussed herein, including any of the benefits disclosed herein. The expression "the device being operative to perform an action" may denote the device 100 being configured to perform the action.

As schematically illustrated in FIG. 18, the device 100 may be embodied by a base station 1800, e.g., functioning as a eNB or gNB. The base station 1800 comprises a radio interface 1802 coupled to the device 100 for radio communication with one or more other base stations and/or radio devices, e.g., functioning as a gNB and a UE, respectively.

Figure 19:
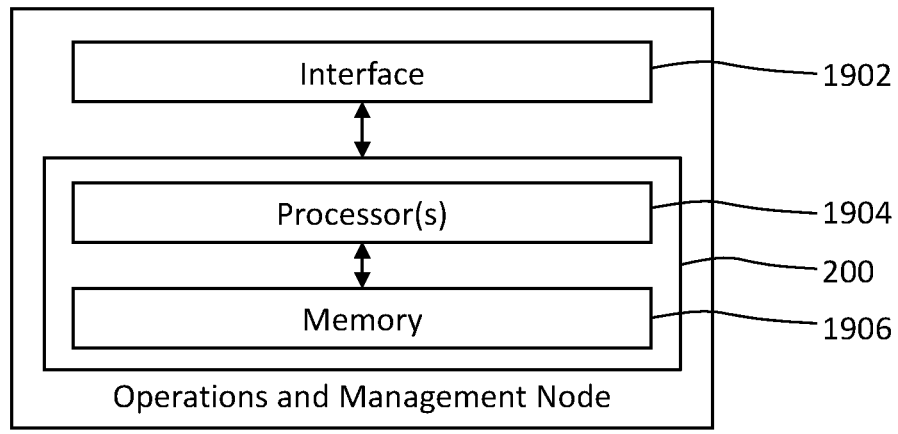
FIG. 19 shows a schematic block diagram of an operations and management node embodying the device of FIG. 2.

FIG. 19 shows a schematic block diagram for an embodiment of the device 200. The device 200 comprises one or more processors 1904 for performing the method 400 and memory 1906 coupled to the processors 1904. For example, the memory 1906 may be encoded with instructions that implement at least one of the modules 202 and 204.

The one or more processors 1904 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1906, OAM functionality. For example, the one or more processors 1904 may execute instructions stored in the memory 1906. Such functionality may include providing various features and steps discussed herein, including any of the benefits disclosed herein. The expression "the device being operative to perform an action" may denote the device 200 being configured to perform the action.

As schematically illustrated in FIG. 19, the device 200 may be embodied by an OAM function of node 1900, e.g., operations and management functions in the TDD network. The OAM node 1900 comprises a wired or radio interface 1902 coupled to the device 200 for wired or radio communication with one or more of the base stations, e.g., functioning as a gNB.

Figure 20:
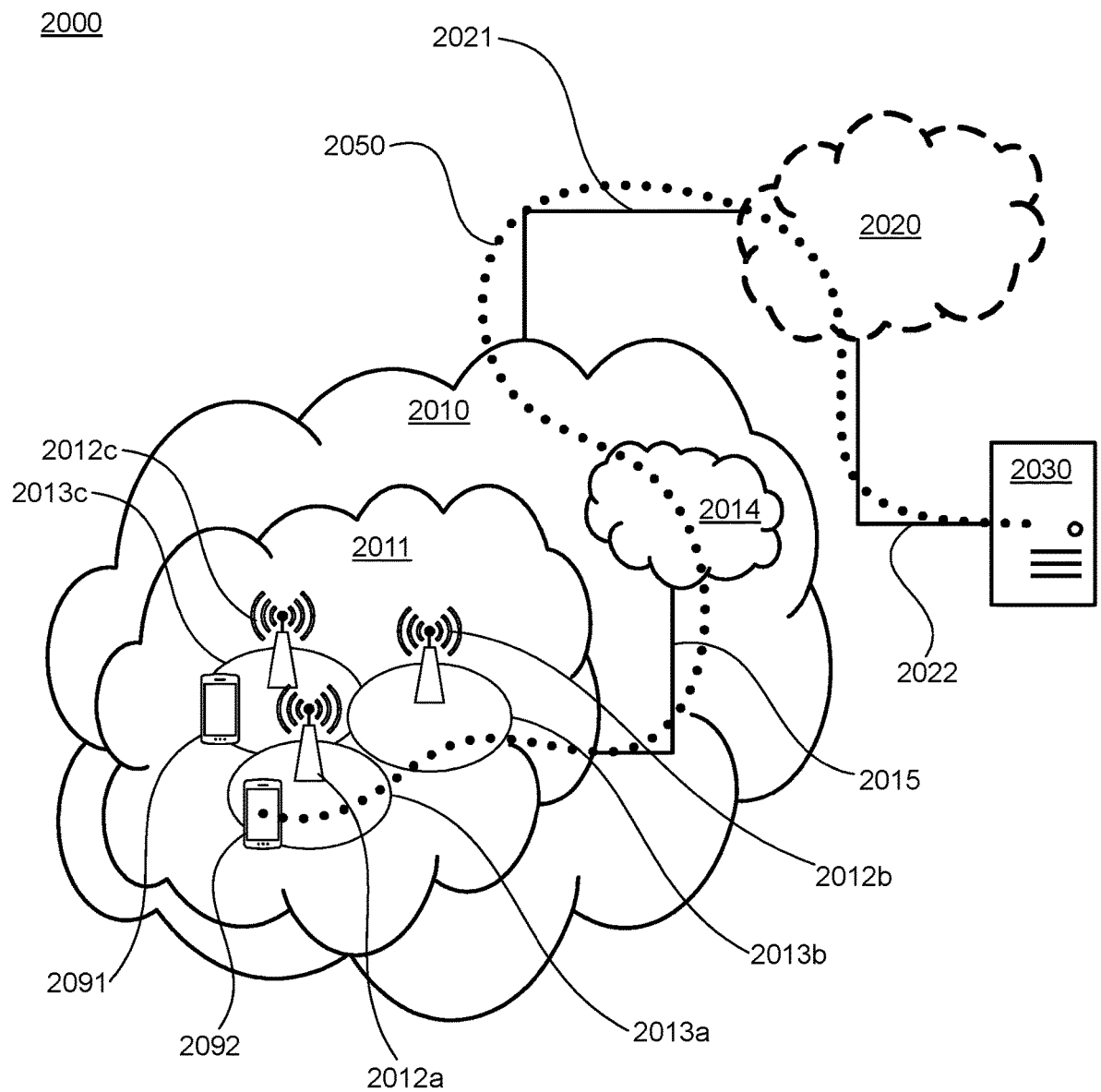
FIG. 20 schematically illustrates an example telecommunication network connected via an intermediate network to a host computer.

With reference to FIG. 20, in accordance with an embodiment, a communication system 2000 includes a telecommunication network 2010, such as a 3GPP-type cellular network, which comprises an access network 2011, such as a radio access network, and a core network 2014. The access network 2011 comprises a plurality of base stations 2012a, 2012b, 2012c, such as NBs, eNBs, gNBs or other types of wireless access points, each defining a corresponding coverage area 2013a, 2013b, 2013c. Each base station 2012a, 2012b, 2012c is connectable to the core network 2014 over a wired or wireless connection 2015. A first user equipment (UE) 2091 located in coverage area 2013c is configured to wirelessly connect to, or be paged by, the corresponding base station 2012c. A second UE 2092 in coverage area 2013a is wirelessly connectable to the corresponding base station 2012a. While a plurality of UEs 2091, 2092 are illustrated in this example, the disclosed embodiments are equally applicable to a situation where a sole UE is in the coverage area or where a sole UE is connecting to the corresponding base station 2012.

Any of the base stations 2012 and the UEs 2091, 2092 may embody the device 100.

The telecommunication network 2010 is itself connected to a host computer 2030, which may be embodied in the hardware and/or software of a standalone server, a cloud-implemented server, a distributed server or as processing resources in a server farm. The host computer 2030 may be under the ownership or control of a service provider, or may be operated by the service provider or on behalf of the service provider. The connections 2021, 2022 between the telecommunication network 2010 and the host computer 2030 may extend directly from the core network 2014 to the host computer 2030 or may go via an optional intermediate network 2020. The intermediate network 2020 may be one of, or a combination of more than one of, a public, private or hosted network; the intermediate network 2020, if any, may be a backbone network or the Internet; in particular, the intermediate network 2020 may comprise two or more sub-networks (not shown).

The communication system 2000 of FIG. 20 as a whole enables connectivity between one of the connected UEs 2091, 2092 and the host computer 2030. The connectivity may be described as an over-the-top (OTT) connection 2050. The host computer 2030 and the connected UEs 2091, 2092 are configured to communicate data and/or signaling via the OTT connection 2050, using the access network 2011, the core network 2014, any intermediate network 2020 and possible further infrastructure (not shown) as intermediaries. The OTT connection 2050 may be transparent in the sense that the participating communication devices through which the OTT connection 2050 passes are unaware of routing of uplink and downlink communications. For example, a base station 2012 need not be informed about the past routing of an incoming downlink communication with data originating from a host computer 2030 to be forwarded (e.g., handed over) to a connected UE 2091. Similarly, the base station 2012 need not be aware of the future routing of an outgoing uplink communication originating from the UE 2091 towards the host computer 2030.

By virtue of the method 100 being performed by any one the base stations serving the UEs 2091 or 2092 and/or any one of the base stations 2012, the performance of the OTT connection 2050 can be improved, e.g., in terms of increased throughput and/or reduced latency.

Example implementations, in accordance with an embodiment of the UE, base station and host computer discussed in the preceding paragraphs, will now be described with reference to FIG. 21. In a communication system 2100, a host computer 2110 comprises hardware 2115 including a communication interface 2116 configured to set up and maintain a wired or wireless connection with an interface of a different communication device of the communication system 2100. The host computer 2110 further comprises processing circuitry 2118, which may have storage and/or processing capabilities. In particular, the processing circuitry 2118 may comprise one or more programmable processors, application-specific integrated circuits, field programmable gate arrays or combinations of these (not shown) adapted to execute instructions. The host computer 2110 further comprises software 2111, which is stored in or accessible by the host computer 2110 and executable by the processing circuitry 2118. The software 2111 includes a host application 2112. The host application 2112 may be operable to provide a service to a remote user, such as a UE 2130 connecting via an OTT connection 2150 terminating at the UE 2130 and the host computer 2110. In providing the service to the remote user, the host application 2112 may provide user data, which is transmitted using the OTT connection 2150. The user data may depend on the location of the UE 2130. The user data may comprise auxiliary information or precision advertisements (also: ads) delivered to the UE 2130. The location may be reported by the UE 2130 to the host computer, e.g., using the OTT connection 2150, and/or by the base station 2120, e.g., using a connection 2160.

The communication system 2100 further includes a base station 2120 provided in a telecommunication system and comprising hardware 2125 enabling it to communicate with the host computer 2110 and with the UE 2130. The hardware 2125 may include a communication interface 2126 for setting up and maintaining a wired or wireless connection with an interface of a different communication device of the communication system 2100, as well as a radio interface 2127 for setting up and maintaining at least a wireless connection 2170 with a UE 2130 located in a coverage area (not shown in FIG. 21) served by the base station 2120. The communication interface 2126 may be configured to facilitate a connection 2160 to the host computer 2110. The connection 2160 may be direct, or it may pass through a core network (not shown in FIG. 21) of the telecommunication system and/or through one or more intermediate networks outside the telecommunication system. In the embodiment shown, the hardware 2125 of the base station 2120 further includes processing circuitry 2128, which may comprise one or more programmable processors, application-specific integrated circuits, field programmable gate arrays or combinations of these (not shown) adapted to execute instructions. The base station 2120 further has software 2121 stored internally or accessible via an external connection.

The communication system 2100 further includes the UE 2130 already referred to. Its hardware 2135 may include a radio interface 2137 configured to set up and maintain a wireless connection 2170 with a base station serving a coverage area in which the UE 2130 is currently located. The hardware 2135 of the UE 2130 further includes processing circuitry 2138, which may comprise one or more programmable processors, application-specific integrated circuits, field programmable gate arrays or combinations of these (not shown) adapted to execute instructions. The UE 2130 further comprises software 2131, which is stored in or accessible by the UE 2130 and executable by the processing circuitry 2138. The software 2131 includes a client application 2132. The client application 2132 may be operable to provide a service to a human or non-human user via the UE 2130, with the support of the host computer 2110. In the host computer 2110, an executing host application 2112 may communicate with the executing client application 2132 via the OTT connection 2150 terminating at the UE 2130 and the host computer 2110. In providing the service to the user, the client application 2132 may receive request data from the host application 2112 and provide user data in response to the request data. The OTT connection 2150 may transfer both the request data and the user data. The client application 2132 may interact with the user to generate the user data that it provides.

Figure 21:
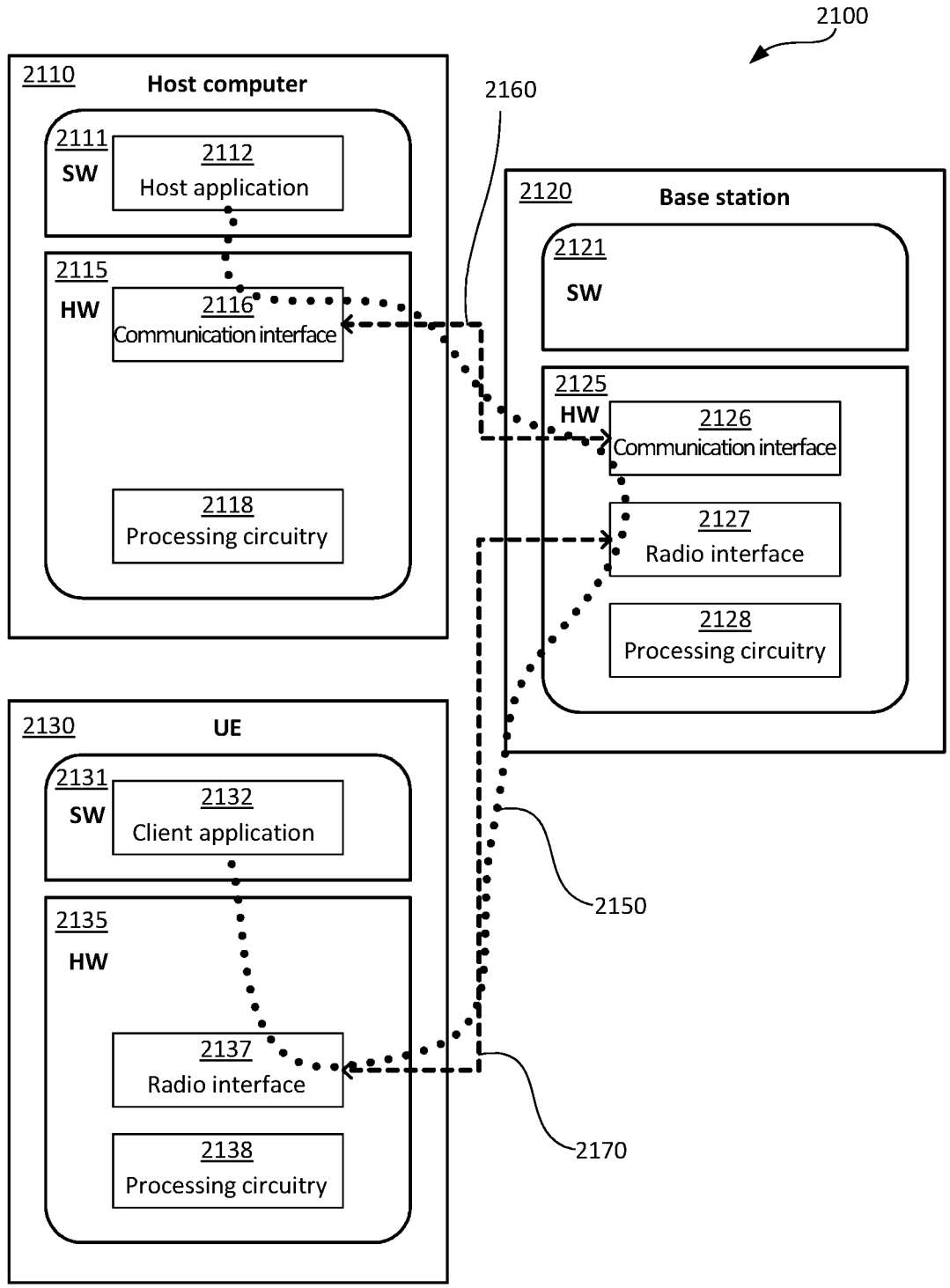
FIG. 21 shows a generalized block diagram of a host computer communicating via a base station or radio device functioning as a gateway with a user equipment over a partially wireless connection.

It is noted that the host computer 2110, base station 2120 and UE 2130 illustrated in FIG. 21 may be identical to the host computer 2030, one of the base stations 2012a, 2012b, 2012c and one of the UEs 2091, 2092 of FIG. 20, respectively. This is to say, the inner workings of these entities may be as shown in FIG. 21, and, independently, the surrounding network topology may be that of FIG. 20.

In FIG. 21, the OTT connection 2150 has been drawn abstractly to illustrate the communication between the host computer 2110 and the UE 2130 via the base station 2120, without explicit reference to any intermediary devices and the precise routing of messages via these devices. Network infrastructure may determine the routing, which it may be configured to hide from the UE 2130 or from the service provider operating the host computer 2110, or both. While the OTT connection 2150 is active, the network infrastructure may further take decisions by which it dynamically changes the routing (e.g., on the basis of load balancing consideration or reconfiguration of the network).

The wireless connection 2170 between the UE 2130 and the base station 2120 is in accordance with the teachings of the embodiments described throughout this disclosure. One or more of the various embodiments improve the performance of OTT services provided to the UE 2130 using the OTT connection 2150, in which the wireless connection 2170 forms the last segment. More precisely, the teachings of these embodiments may reduce the latency and improve the data rate and thereby provide benefits such as better responsiveness and improved QoS.

A measurement procedure may be provided for the purpose of monitoring data rate, latency, QoS and other factors on which the one or more embodiments improve. There may further be an optional network functionality for reconfiguring the OTT connection 2150 between the host computer 2110 and UE 2130, in response to variations in the measurement results. The measurement procedure and/or the network functionality for reconfiguring the OTT connection 2150 may be implemented in the software 2111 of the host computer 2110 or in the software 2131 of the UE 2130, or both. In embodiments, sensors (not shown) may be deployed in or in association with communication devices through which the OTT connection 2150 passes; the sensors may participate in the measurement procedure by supplying values of the monitored quantities exemplified above, or supplying values of other physical quantities from which software 2111, 2131 may compute or estimate the monitored quantities. The reconfiguring of the OTT connection 2150 may include message format, retransmission settings, preferred routing etc.; the reconfiguring need not affect the base station 2120, and it may be unknown or imperceptible to the base station 2120. Such procedures and functionalities may be known and practiced in the art. In certain embodiments, measurements may involve proprietary UE signaling facilitating the host computer's 2110 measurements of throughput, propagation times, latency and the like. The measurements may be implemented in that the software 2111, 2131 causes messages to be transmitted, in particular empty or "dummy" messages, using the OTT connection 2150 while it monitors propagation times, errors etc.

Figures 22, 23:
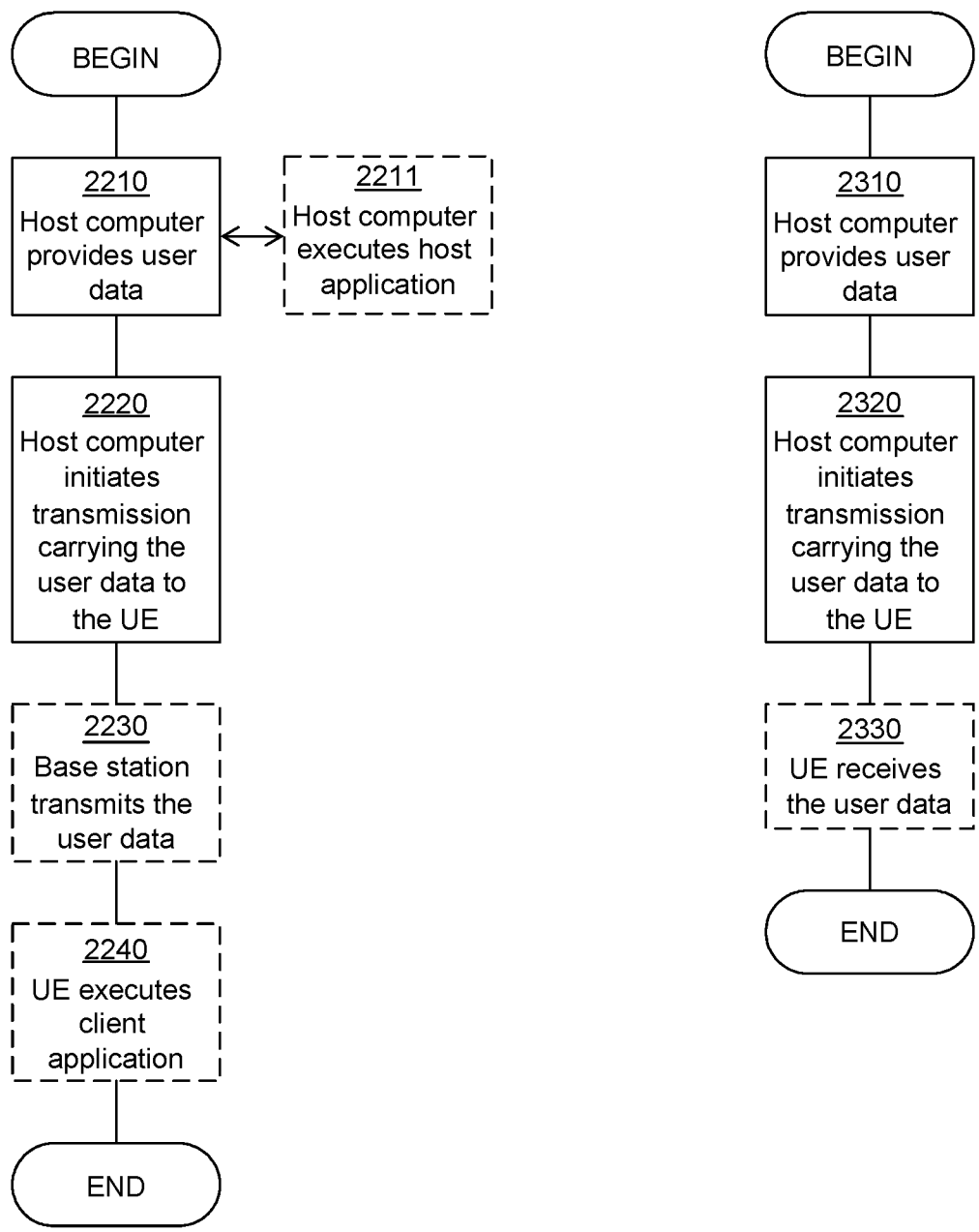
FIGS. 22 and 23 show flowcharts for methods implemented in a communication system including a host computer, a base station or radio device functioning as a gateway and a user equipment.

FIG. 22 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 22 will be included in this paragraph. In a first step 2210 of the method, the host computer provides user data. In an optional substep 2211 of the first step 2210, the host computer provides the user data by executing a host application. In a second step 2220, the host computer initiates a transmission carrying the user data to the UE. In an optional third step 2230, the base station transmits to the UE the user data which was carried in the transmission that the host computer initiated, in accordance with the teachings of the embodiments described throughout this disclosure. In an optional fourth step 2240, the UE executes a client application associated with the host application executed by the host computer.

FIG. 23 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 23 will be included in this paragraph. In a first step 2310 of the method, the host computer provides user data. In an optional substep (not shown) the host computer provides the user data by executing a host application. In a second step 2320, the host computer initiates a transmission carrying the user data to the UE. The transmission may pass via the base station, in accordance with the teachings of the embodiments described throughout this disclosure. In an optional third step 2330, the UE receives the user data carried in the transmission.

Any embodiment may define or determine a candidate RIM-RS resource set, which is a subset of all possible RIM-RS resources. A RIM-RS may be transmitted only on the defined or determined candidate RIM-RS resources.

As has become apparent from above description, embodiments of the technique allow the OAM to flexibly adapt the RIM-RS resource configuration according to the network needs or requirements.

For instance, if the network is configured with two concatenated TDD patterns, and one TDD pattern is configured with a relatively short UL period, then, it can be configured to not transmit RIM-RS within all time periods that correspond to the one TDD pattern. Moreover, the technique may be implemented to limit the RS detection complexity at the network node.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention may be limited (e.g., only) by the scope of the following embodiments.

Any one of the embodiments in the following the list of embodiments may be claimed independently or in combination with any one of the afore-mentioned embodiments and/or any one of the other embodiments in the following list. The indented text in the following list of embodiments comprises optional features, which can be combined with any one of the afore-mentioned embodiments and/or any one of the embodiments in the following list.

EMBODIMENTS

1. A method (300) of handling a remote interference, RI (702), between base stations (602, 604) of a time division duplex, TDD, network, the method comprising or initiating the steps of:

determining (302) a set of radio resources (1402) for reference signals, RSs (900), for handling the RI (702); and handling (304) the RI (702) by at least one of transmitting and receiving one or more RSs using the radio resources of the determined set.

2. The method of embodiment 1, wherein the RI (702) comprises a downlink (DL) transmission from one of the base stations that interferes with an uplink (UL) reception of another one of the base stations.

3. The method of embodiment 1 or 2, wherein the TDD network uses one or two TDD UL-DL patterns (606) for each of the base stations (602, 604).

4. The method of embodiment 3, wherein the same one or two TDD UL-DL patterns (606) are used for each of the base stations (602, 604).

5. The method of embodiment 3 or 4, wherein the one or two TDD UL-DL patterns (606) are synchronized between the base stations (602, 604).

6. The method of any one of embodiments 1 to 5, wherein the TDD network uses two concatenated or consecutive TDD UL-DL patterns (606).

7. The method of any one of embodiments 3 to 6, wherein the determined set of radio resources (1402) for the RS (900) comprises radio resource occasions (1402) for the RSs (900) in one of the two TDD UL-DL patterns (606) and/or excludes radio resource occasions (1402) for the RSs (900) in the other one of the two TDD UL-DL patterns (606).

8. The method of any one of embodiments 3 to 7, wherein a first TDD UL-DL pattern of the two TDD UL-DL patterns (606) comprises more UL slots or more UL symbols than a second TDD UL-DL pattern of the two TDD UL-DL patterns (606).

9. The method of any one of embodiments 3 to 8, wherein a first TDD UL-DL pattern of the two TDD UL-DL patterns (606) comprises an UL duration (612) that is longer than an UL duration (612) of a second TDD UL-DL pattern of the two TDD UL-DL patterns (606).

10. The method of any one of embodiments 3 to 9, wherein a duration of UL resources (612) and flexible resources (608) is longer in a first TDD UL-DL pattern of the two TDD UL-DL patterns (606) compared to a second TDD UL-DL pattern of the two TDD UL-DL patterns (606).

11. The method of any one of embodiments 8 to 10, wherein the determined set of radio resources (1402) for the RS (900) comprises radio resource occasions (1402) for the RS (900) in the first TDD UL-DL pattern and/or excludes radio resource occasions (1402) for the RS (900) in the second TDD UL-DL pattern.

Herein, the expressions (e.g., TDD) UL-DL pattern and (e.g., TDD) DL-UL pattern may be used interchangeably. Similarly, the expressions (e.g., TDD) UL-DL switching point and (e.g., TDD) DL-UL switching point may be used interchangeably. Similarly, the expressions (e.g., TDD) UL-DL switching period and (e.g., TDD) DL-UL switching period may be used interchangeably.

12. The method of any one of embodiments 1 to 11, wherein the set is determined by including radio resource occasions (1402) for the RS (900) in the TDD network, or of a TDD UL-DL pattern in the TDD network, within a certain time duration and repeating the set according to a periodicity.

13. The method of any one of embodiments 1 to 12, wherein the set is determined by including two consecutive radio resource occasions (1402) for the RSs (900) in the TDD network and repeating the set with a periodicity that is an integer multiple of the TDD UL-DL switching period.

14. The method of embodiment 13, wherein the integer is greater than 3.

15. The method of any one of embodiments 1 to 14, wherein the set is determined by including every N-th radio resource occasions (1402) for the RSs (900) in the TDD network.

16. The method of embodiment 15, wherein the N is 2.

Herein, determining the set by "including" a radio resource may comprise a step of including the respective radio resource or may define the set to comprise the respective radio resource, e.g., as a result of the determination.

17. The method of any one of embodiments 1 to 16, wherein the set is determined by including radio resource occasions for the RSs (900) in a TDD UL-DL pattern (606) of the TDD network, if an UL duration (612) of the TDD UL-DL pattern (606) is greater than or equal to a threshold.

18. The method of embodiment 17, wherein the threshold corresponds to a minimum distance between an interfering base station or a set of interfering base stations and an interfered base station or a set of interfered base stations.

19. The method of any one of embodiments 1 to 18, wherein the set is determined 100 based on a complexity condition for RS detection based on the set.

20. The method of any one of embodiments 1 to 19, wherein the set is determined by including radio resource occasions for the RSs (900) in a TDD UL-DL pattern (606) of the TDD network, if an duration of the TDD UL-DL pattern (606) is greater than or equal to a threshold, and/or by excluding radio resource occasions for the RSs (900) in a TDD UL-DL pattern (606) of the TDD network, if an duration of the TDD UL-DL pattern (606) is less than the threshold.

21. The method of any one of embodiments 1 to 20, wherein the set of radio resources (1402) is a proper subset of radio resource occasions (1402) for the RSs (900) in the TDD network.

22. The method of any one of embodiments 1 to 21, wherein each TDD UL-DL switching period of the TDD network comprises one or at least one radio resource occasion (1402) for the RSs (900).

23. The method of any one of embodiments 1 to 22, wherein each TDD UL-DL switching point of a TDD UL-DL pattern (606) in the TDD network is associated with one or at least one radio resource occasion (1402) for the RSs (900).

Herein, the expression radio resource occasion may encompass a radio resource time occasion and/or a radio resource frequency occasion.

24. The method of any one of embodiments 1 to 23, wherein the set of radio resources is positively defined by determining a set of usable radio resources that are usable or used for the in the transmission of the radio resources.

25. The method of any one of embodiments 1 to 24, wherein the set of radio resources is negatively defined by determining a set of excluded radio resources that are not usable or not used for the in the transmission of the radio resources.

The RIM-RS may also be referred to as a remote interference mitigation RS.

26. The method of any one of embodiments 1 to 25, wherein the handling (304) of the RI (702) comprises an over-the-air communication between the base stations (602, 604) based on the one or more transmitted and/or received RSs (900).

27. The method of any one of embodiments 1 to 26, wherein the base stations (602, 604) comprise at least one base station (602) that is interfered by the RI (702) and at least one interfering base station (604) that is causing the RI (702) or is a source of the RI (702).

One or more RSs may be transmitted from the interfering base station to the interfered base station, and/or vice versa, according to the handling step.

28. The method of any one of embodiments 1 to 27, wherein the method (300) is performed by the interfered base station (602) among the base stations (602, 604).

29. The method of any one of embodiments 1 to 28, wherein the method (300) is performed by the interfering base station (604) among the base stations (602, 604).

30. The method of any one of embodiments 1 to 29, wherein the reception (304) of one or more RSs is indicative of at least one of a too short guard period (608) in an TDD UL-DL pattern (606) of the TDD network and the temporal presence of a ducting layer (704) between the base stations (602, 604).

31. The method of any one of embodiments 1 to 30, wherein the handling (302) of the RI (702) comprises a RI management, RIM, framework (1000).

32. The method of any one of embodiments 1 to 31, wherein the RSs (900) are special RSs for the handling (304) of the RI (702) or RI management RSs, RIM-RS.

33. The method of any one of embodiments 1 to 32, further comprising or initiating the step of:
receiving a first control message from an Operations And Management, OAM, function or node (1002) of the TDD network, the first control message being indicative of whether the receiving (304) and/or transmitting (304) of the RSs (900) is restricted to the set or allowed in all radio resource occasions (1402) for the RSs (900) in the TDD network.

34. The method of any one of embodiments 1 to 33, wherein the step (302) of determining the set comprises:
receiving a second control message from an Operations And Management, OAM, function or node (1002) of the TDD network, the second control message being indicative of at least one of the set and one or more rules or conditions for the determination (302) of the set.

35. A method (400) of controlling the handling of a remote interference, RI (702), between base stations (602, 604) of a time division duplex, TDD, network, wherein the RI (702) is handled based on at least one of transmitting and receiving one or more reference signals, RSs (900), at the base stations (602, 604), the method comprising or initiating the steps of:
determining (402) a set of radio resources (1402) for the RSs (900) for the handling of the RI (702) and/or determining whether the receiving and/or transmitting of the RSs (900) is restricted to the set or allowed in all radio resource occasions (1402) for the RSs (900) in the TDD network; and
transmitting (404), to at least one of the base stations (602, 604), one or more control messages indicative of one or each of the results of the determination (402).

36. The method of embodiment 35, wherein the method (400) is performed by an Operations And Management, OAM, function or OAM node (1002) of the TDD network.

37. The method of embodiment 35 or 36, further comprising or initiating at least one of the steps or comprising at least one of the features corresponding to any one of embodiments 1 to 20.

38. A computer program product comprising program code portions for performing the steps of any one of the embodiments 1 to 34 or 35 to 37 when the computer program product is executed on one or more computing devices, optionally stored on a computer-readable recording medium.

39. A device (100; 602; 604; 1800; 2120) for handling a remote interference, RI (702), between base stations (602, 604) of a time division duplex, TDD, network (2000; 2100), the device (100; 602; 604; 1800; 2120) being configured to trigger or perform the steps of:
  determining (302) a set of radio resources (1402) for reference signals, RSs (900), for handling the RI (702); and
  handling (304) the RI (702) by at least one of transmitting and receiving one or more RSs using the radio resources of the determined set.

40. The device (100; 602; 604; 1800; 2120) of embodiment 39, further configured to trigger or perform the steps of any one of embodiments 1 to 34.

41. A device (200; 1002; 1900) for controlling the handling of a remote interference, RI (702), between base stations (602, 604) of a time division duplex, TDD, network, wherein the RI (702) is handled based on at least one of transmitting and receiving one or more reference signals, RSs (900), at the base stations (602, 604), the device (100) being configured to trigger or perform the steps of:
  determining (402) a set of radio resources (1402) for the RSs (900) for the handling of the RI (702) and/or determining whether the receiving and/or transmitting of the RSs (900) is restricted to the set or allowed in all radio resource occasions (1402) for the RSs (900) in the TDD network; and
  transmitting (404), to at least one of the base stations (602, 604), one or more control messages indicative of one or each of the results of the determination (402).

42. The device (200; 1002; 1900) of embodiment 41, further configured to trigger or perform the steps of any one of embodiments 35 to 37.

43. A device (100; 602; 604; 1800; 2120) for handling a remote interference, RI (702), between base stations (602, 604) of a time division duplex, TDD, network (2000; 2100), the device (100; 602; 604; 1800; 2120) comprising at least one processor (1804) and a memory (1806), said memory (1806) comprising instructions executable by said at least one processor (1804), whereby the device (100; 602; 604; 1800; 2120) is operative to:
  determine (302) a set of radio resources (1402) for reference signals, RSs (900), for handling the RI (702); and
  handle (304) the RI (702) by at least one of transmitting and receiving one or more RSs using the radio resources of the determined set.

44. The device of embodiment 43, further operative to perform the steps of any one of embodiments 1 to 34.

45. A device (200; 1002; 1900) for controlling the handling of a remote interference, RI (702), between base stations (602, 604) of a time division duplex, TDD, network, wherein the RI (702) is handled based on at least one of transmitting and receiving one or more reference signals, RSs (900), at the base stations (602, 604), the device (200; 1002; 1900) comprising at least one processor (1904) and a memory (1906), said memory (1906) comprising instructions executable by said at least one processor (1904), whereby the device (200; 1002; 1900) is operative to:
  determine (402) a set of radio resources (1402) for the RSs (900) for the handling of the RI (702) and/or determining whether the receiving and/or transmitting of the RSs (900) is restricted to the set or allowed in all radio resource occasions (1402) for the RSs (900) in the TDD network; and
  transmit (404), to at least one of the base stations (602, 604), one or more control messages indicative of one or each of the results of the determination (402).

46. The device of embodiment 45, further operative to perform the steps of any one of embodiments 35 to 37.

47. A communication system (2100) including a host computer (2110) comprising:
  processing circuitry (2118) configured to provide user data; and
  a communication interface (2116) configured to forward user data to a cellular TDD network (2000; 2100) for transmission to a user equipment, UE, (614; 2130) wherein the cellular TDD network (2000; 2100) comprises a radio interface (2137) and processing circuitry (2138), the processing circuitry (2138) of the cellular TDD network (2000; 2100) being configured to execute the steps of any one of embodiments 1 to 34.

48. The communication system (2100) of embodiment 47, further including the UE (614; 2130).

49. The communication system (2100) of embodiment 47 or 48, wherein the cellular TDD network (2000; 2100) further comprises a base station (602; 604), which is configured to communicate with the UE (614; 2130) and/or to perform the method (300) according to any one of the embodiments 1 to 34.

50. The communication system (2100) of any one of embodiments 47 to 49, wherein:
  the processing circuitry (2118) of the host computer (2110) is configured to execute a host application, thereby providing the user data; and
  the processing circuitry (2138) of the UE (614; 2130) is configured to execute a client application associated with the host application.

The invention claimed is:

1. A method of handling a remote interference (RI) between base stations of a time division duplex (TDD) network, the method comprising:
  determining a set of radio resources for reference signals (RSs) for handling the RI by:
    receiving a first flag parameter from an Operations And Management (OAM) function or node of the TDD network, the first flag parameter being indicative of whether receiving and/or transmitting of the RSs is restricted to the set or allowed in all radio resource occasions for the RSs in the TDD network; and
    receiving a second flag parameter from an OAM function or node of the TDD network, the second flag parameter being indicative of at least one of the set and one or more rules or conditions for the determination of the set; and
  handling the RI by transmitting one or more RSs using the radio resources of the determined set.

2. The method of claim 1, wherein the set is determined by including two consecutive radio resource occasions for the RSs in the TDD network and repeating the set with a periodicity that is an integer multiple of the TDD Uplink-Downlink (UL-DL) switching period.

3. The method of claim 2, wherein the integer is greater than 3.

4. The method of claim 1, wherein the set is determined by including every N-th radio resource occasions for the RSs in the TDD network.

5. The method of claim 4, wherein N is 2.

6. The method of claim 1, wherein the set of radio resources is a proper subset of radio resource occasions for the RSs in the TDD network.

7. The method of claim 2, wherein each TDD UL-DL switching period of the TDD network comprises at least one radio resource occasion for the RSs.

8. The method of claim 2, wherein each TDD UL-DL switching point of a TDD UL-DL pattern in the TDD network is associated with at least one radio resource occasion for the RSs.

9. The method of claim 1, wherein the set of radio resources is positively defined by determining a set of usable radio resources that are usable or used for transmission of the radio resources.

10. The method of claim 1, wherein the set of radio resources is negatively defined by determining a set of excluded radio resources that are not usable or not used for transmission of the radio resources.

11. The method of claim 1, wherein the handling of the RI comprises an over-the-air communication between the base stations based on the one or more transmitted and/or received RSs.

12. The method of claim 1, wherein the base stations comprise at least one base station that is interfered by the RI and at least one interfering base station that is causing the RI or is a source of the RI.

13. The method of claim 12, wherein the method is performed by the interfered base station among the base stations.

14. The method of claim 12, wherein the method is performed by the interfering base station among the base stations.

15. The method of claim 2, wherein reception of one or more RSs is indicative of: a too short guard period in an TDD UL-DL pattern of the TDD network and/or temporal presence of a ducting layer between the base stations.

16. The method of claim 1, wherein the handling of the RI comprises a RI management framework.

17. The method of claim 1, wherein the RSs are special RSs for the handling of the RI or RI management RSs.

18. The method of claim 1, wherein the first flag parameter is indicative of no set of RSs being configured.

19. The method of claim 1, wherein the second flag parameter is indicative of that a set of RSs is configured.

20. A non-transitory computer readable recording medium storing a computer program product for controlling handling a remote interference (RI) between base stations of a time division duplex (TDD) network, the computer program product comprising program instructions which, when run on processing circuitry of a device, causes the device to:
  determine a set of radio resources for reference signals (RSs) for handling the RI by:
    receiving a first flag parameter from an Operations And Management (OAM) function or node of the TDD network, the first flag parameter being indicative of whether receiving and/or transmitting of the RSs is restricted to the set or allowed in all radio resource occasions for the RSs in the TDD network; and
    receiving a second flag parameter from an OAM function or node of the TDD network, the second flag parameter being indicative of at least one of the set and one or more rules or conditions for the determination of the set; and
  handle the RI by transmitting one or more RSs using the radio resources of the determined set.

21. A device for handling a remote interference (RI) between base stations of a time division duplex (TDD) network, the device comprising:
  processing circuitry;
  memory containing instructions executable by the processing circuitry whereby the device is operative to:
    determine a set of radio resources for reference signals (RSs) for handling the RI by: receiving a first flag parameter from an Operations And Management (OAM) function or node of the TDD network, the first flag parameter being indicative of whether receiving and/or transmitting of the RSs is restricted to the set or allowed in all radio resource occasions for the RSs in the TDD network; and
    receiving a second flag parameter from an OAM function or node of the TDD network, the second flag parameter being indicative of at least one of the set and one or more rules or conditions for the determination of the set; and
  handle the RI by transmitting one or more RSs using the radio resources of the determined set.

* * * * *